US011656894B2

(12) United States Patent
Lee et al.

(10) Patent No.: US 11,656,894 B2
(45) Date of Patent: May 23, 2023

(54) ELECTRONIC DEVICE AND METHOD FOR PROVIDING IN-VEHICLE INFOTAINMENT SERVICE

(71) Applicant: SAMSUNG ELECTRONICS CO., LTD., Suwon-si (KR)

(72) Inventors: Sungjun Lee, Suwon-si (KR); Sungdae Cho, Suwon-si (KR); Hoon Choi, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 16/687,928

(22) Filed: Nov. 19, 2019

(65) Prior Publication Data
US 2020/0159562 A1 May 21, 2020

(30) Foreign Application Priority Data
Nov. 19, 2018 (KR) .................... 10-2018-0142812

(51) Int. Cl.
G06F 9/455 (2018.01)
G06F 3/14 (2006.01)
G06F 8/61 (2018.01)
(52) U.S. Cl.
CPC ............ *G06F 9/45558* (2013.01); *G06F 3/14* (2013.01); *G06F 8/61* (2013.01); *G06F 2009/45575* (2013.01)
(58) Field of Classification Search
None
See application file for complete search history.

(56) References Cited

U.S. PATENT DOCUMENTS 9,003,405 B1 4/2015 Hotra
10,318,328 B2 6/2019 Lee et al.
(Continued)

FOREIGN PATENT DOCUMENTS

CN 108513655 A 9/2018
CN 108536500 A 9/2018
(Continued)

OTHER PUBLICATIONS

European Office Action dated Dec. 8, 2020 in corresponding European Application No. 19210125.1.
(Continued)

*Primary Examiner* — Wynuel S Aquino
(74) *Attorney, Agent, or Firm* — Nixon & Vanderhye P.C.

(57) ABSTRACT

An electronic device for providing an in-vehicle infotainment (IVI) service using migration and a method thereof are provided. The electronic device includes a housing, a connector exposed through the housing and connected to an IVI system, a processor positioned in the housing and operatively connected with the connector, and a memory positioned in the housing and be operatively connected with the processor. The memory includes a first system software, a hypervisor configured to execute the first system software, and instructions. The instructions, when executed by the processor, control the electronic device to: receive state information about the IVI system through the connector, receive at least part of a second system software of the IVI system through the connector, install the at least part of the second system software to execute on the hypervisor, cause the IVI system to be inactivated, execute the first system software and the second system software on the hypervisor using at least part of the state information, and provide data resulting from operations of the first system software and the
(Continued)

second system software to the IVI system through the connector.

14 Claims, 19 Drawing Sheets

(56) References Cited

U.S. PATENT DOCUMENTS

| | | |
|---|---|---|
| 2008/0147321 A1 | 6/2008 | Howard et al. |
| 2012/0324482 A1* | 12/2012 | Park ............... G06F 9/541 719/328 |
| 2013/0227559 A1* | 8/2013 | Tsirkin ........... G06F 9/45558 718/1 |
| 2016/0014257 A1 | 1/2016 | He et al. |
| 2016/0328254 A1* | 11/2016 | Ahmed ........... G06F 9/45558 |
| 2017/0180547 A1 | 6/2017 | Magahern et al. |
| 2018/0253202 A1 | 9/2018 | Kong et al. |
| 2018/0307515 A1* | 10/2018 | Meller ............ G06F 9/45558 |

FOREIGN PATENT DOCUMENTS

| | | |
|---|---|---|
| CN | 108829235 A | 11/2018 |
| EP | 2 677 428 A2 | 12/2013 |
| KR | 10-2017-0013115 | 2/2017 |
| WO | 2015/103374 | 7/2015 |
| WO | 2016/055844 A2 | 4/2016 |
| WO | WO 2016/055844 A2 | 4/2016 |

OTHER PUBLICATIONS

Extended European Search Report and Written Opinion dated Feb. 25, 2020 in counterpart European Application No. EP19219125.1.
International Search Report and Written Opinion dated Mar. 9, 2020 in counterpart International Application No. PCT/KR2019/015851.
Chinese Office Action dated Nov. 17, 2022 for CN Application No. 201911133700.7.

* cited by examiner

ELECTRONIC DEVICE AND METHOD FOR PROVIDING IN-VEHICLE INFOTAINMENT SERVICE

CROSS-REFERENCE TO RELATED APPLICATION

This application is based on and claims priority under 35 U.S.C. § 119 to Korean Patent Application No. 10-2018-0142812, filed on Nov. 19, 2018, in the Korean Intellectual Property Office, the disclosure of which is incorporated by reference herein in its entirety.

BACKGROUND

Field

The disclosure relates to an electronic device for providing an in-vehicle infotainment (IVI) service using migration and a method thereof.

Description of Related Art

To provide an enhanced user experience in a vehicle, an electronic device for providing a service distinct from a service provided through a display of a head unit in the vehicle is being developed.

An electronic device can display a user interface for in-vehicle infotainment (IVI) service, through a display that is operatively connected with another electronic device embedded in a vehicle and is embedded in the vehicle based on the connection with the another electronic device. This user interface may be different from another user interface for IVI service that, while the another electronic device operates independently from the electronic device, is provided by the another electronic device and is displayed through the display embedded in the vehicle. Owing to a difference between the user interface and the another user interface, severed usability can occur.

The above information is presented as background information only to assist with an understanding of the present disclosure. No determination has been made, and no assertion is made, as to whether any of the above might be applicable as prior art with regard to the present disclosure.

SUMMARY

An electronic device according to various example embodiments includes a housing, a connector configured to be exposed through the housing, and to be connected to an in-vehicle infotainment (IVI) system, a processor positioned in the housing and operatively connected with the connector, and a memory positioned in the housing and operatively connected with the processor. The memory includes a first operating system (OS), a hypervisor configured to execute the first operating system, and instructions. When being executed in a state of where the processor is connected to the IVI system through the connector, the instructions cause the processor to control the electronic device to: receive state information about the IVI system through the connector, receive at least part of a second operating system of the IVI system through the connector, install the at least part of the second operating system to execute on the hypervisor, cause the IVI system to be inactivated, execute the first operating system and the second operating system on the hypervisor using at least part of the state information, and provide data resulting from operations of the first operating system and the second operating system to the IVI system through the connector.

An electronic device connectable to another electronic device embedded in a vehicle according to various example embodiments, may include a memory configured to store a first system software and a second system software, communication circuitry, and at least one processor. The at least one processor may be configured, using the first system software, to control the electronic device to migrate information about a first virtual machine executed on a third system software installed in the another electronic device from the another electronic device to the electronic device through the communication circuitry, acquire data about at least one first visual object from the information about the first virtual machine using the first system software, acquire data about at least one second visual object from information about a second virtual machine executed on the second system software using the first system software, acquire information about a screen including the at least one first visual object and the at least one second visual object using the first system software, transmit the information about the screen to the another electronic device through the communication circuitry so that the screen is displayable on a display of the another electronic device.

An electronic device embedded in a vehicle, connectable with another electronic device according to various embodiments, may include communication circuitry, a display, a memory configured to store a first system software and a second system software, and at least one processor. The at least one processor may be configured to control the electronic device to: migrate information about a first virtual machine executed on the second system software from the electronic device to the another electronic device through the communication circuitry, using the first system software, and receive information about a screen to be displayed on the display, from the another electronic device through the communication circuitry, using the first system software, and based on the receiving, display, on the display, the screen including at least one first visual object acquired from the information about the first virtual machine, and at least one second visual object acquired from information about a second virtual machine executed on a second system software installed in the another electronic device.

An electronic device connectable with another electronic device embedded in a vehicle according to various embodiments and a method thereof may provide an enhanced user experience (UX), by transmitting, to the another electronic device, information about a screen that will be displayed on a display of the another electronic device based on information about a virtual machine migrated from the another electronic device to the electronic device.

An effect obtainable in various example embodiments of the present disclosure is not limited to the above-mentioned effects, and other effects not mentioned will be apparent from the following disclosure by one of ordinary skill in the art to which the present disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
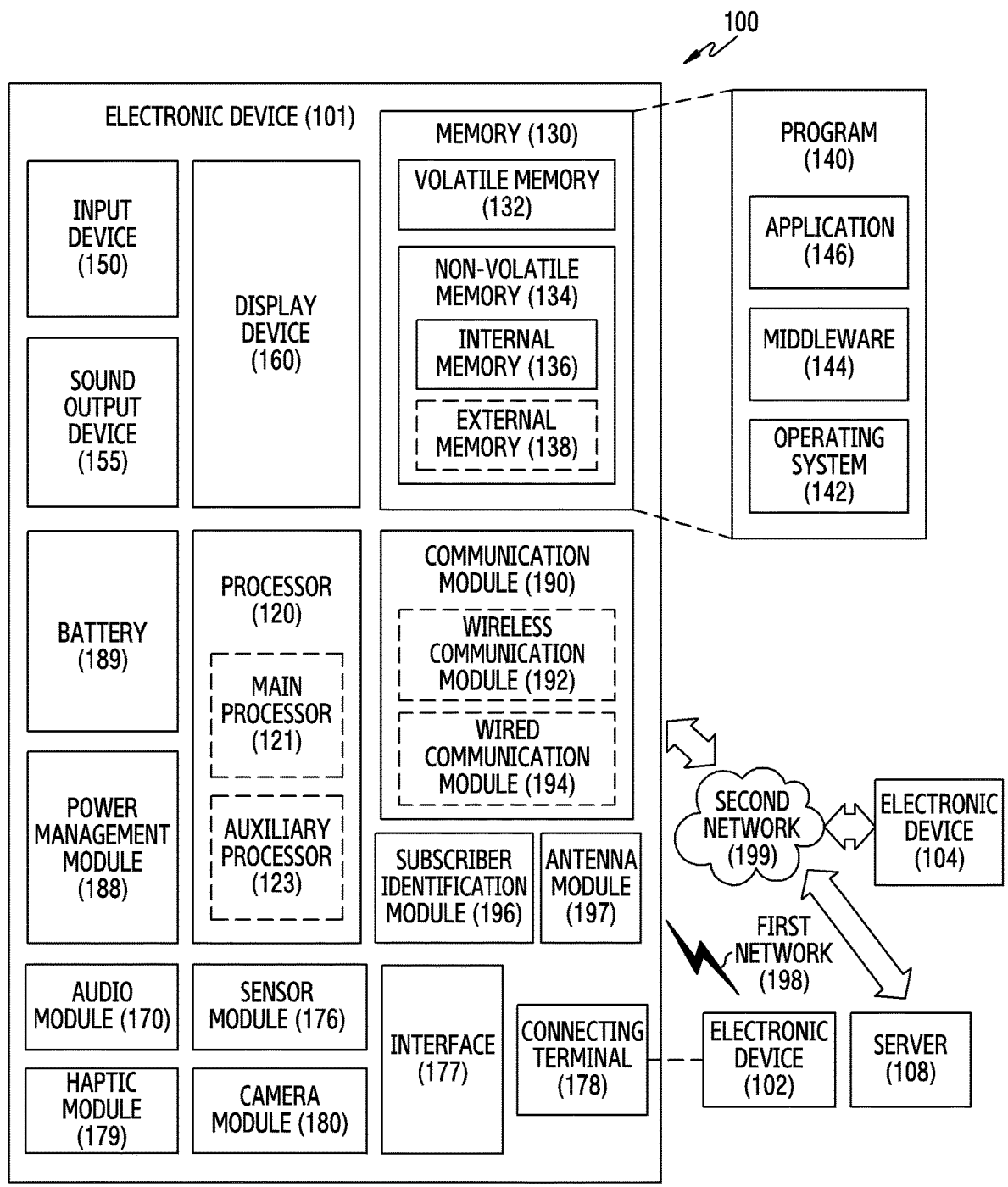
FIG. 1 is a block diagram illustrating an example electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
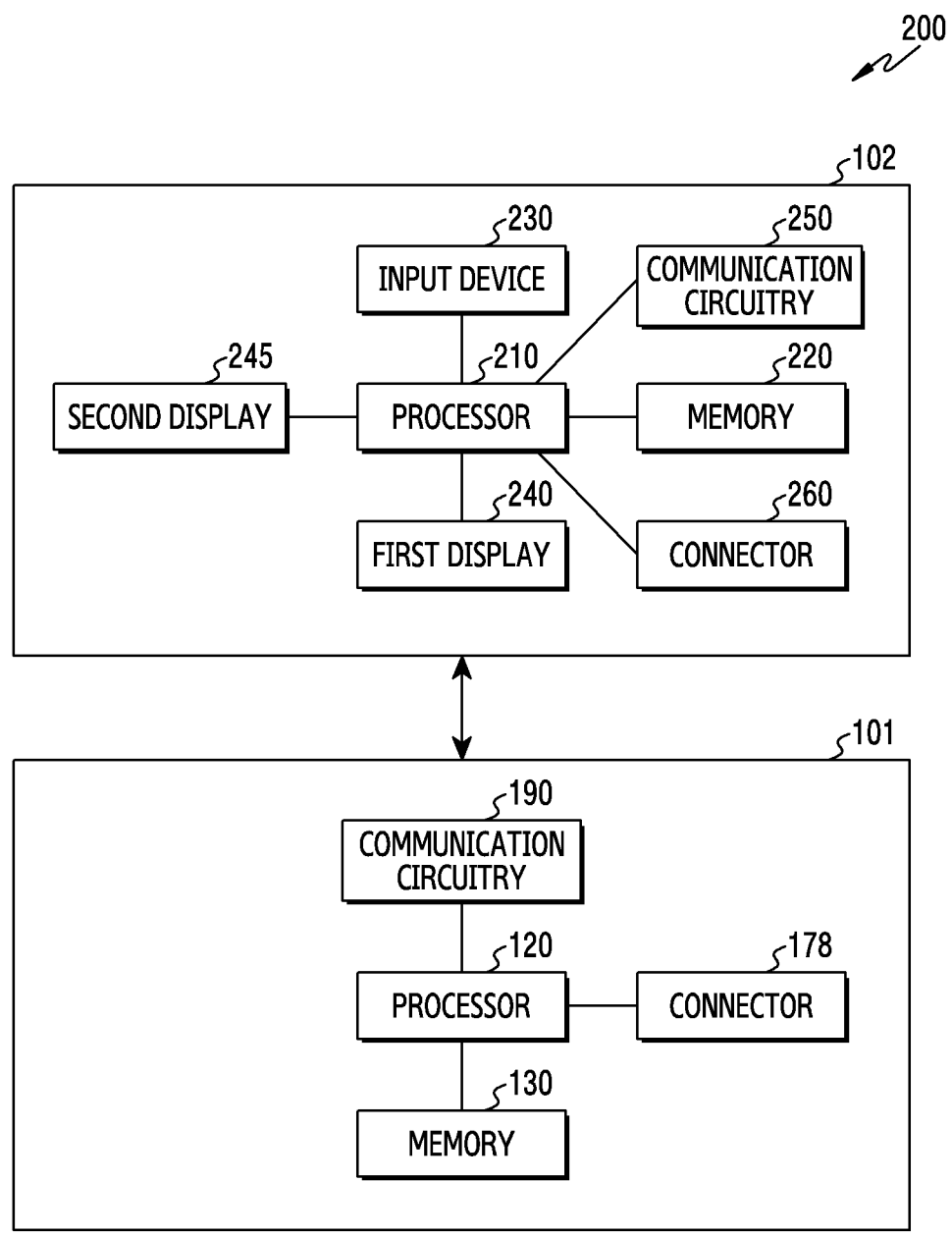
FIG. 2 is a block diagram illustrating an example first electronic device and an example second electronic device according to various embodiments.

FIG. 2 is block diagrams illustrating an example first electronic device and an example second electronic device according to various embodiments.

According to various embodiments, the first electronic device 101 may be included in the electronic device 101 illustrated in FIG. 1. The second electronic device 102 may be included in the electronic device 102 illustrated in FIG. 1.

Referring to FIG. 2, the network environment 200 may include the first electronic device 101 and the second electronic device 102.

In various embodiments, the first electronic device 101 may be positioned in a vehicle. In various embodiments, to provide information to a driver in the vehicle, the first electronic device 101 may be positioned in the vehicle.

In various embodiments, the first electronic device 101 may be a device which has mobility while being temporarily fixed in the vehicle. For example, the first electronic device 101 may, for example, and without limitation, be any one of a smart phone which is fixed or attachable through a connector embedded in the vehicle, a tablet personal computer (PC), a laptop computer, and/or a computer program product with a universal serial bus (USB) port, or the like.

In various embodiments, the first electronic device 101 may be a fixed device which is embedded in a vehicle as well. For example, the first electronic device 101 may be a computing device which is inserted into the vehicle through tuning after a production process.

In various embodiments, the first electronic device 101 may be a device for providing an in-vehicle infotainment (IVI) service through an output device (e.g., a display or speaker) embedded in a vehicle.

In various embodiments, the second electronic device 102 may be referred to as an IVI device in the present disclosure, in aspect of providing an IVI service.

In various embodiments, the second electronic device 102 may be positioned in a vehicle. In various embodiments, the second electronic device 102 may be a computing device which is inserted into the vehicle in a vehicle production process. For example, the second electronic device 102 may be a device which is constructed integrally with a third electronic device (not shown) installed in the vehicle and performing electronic control in order to provide at least one service distinct from an IVI service in the vehicle, or which is operatively connected with the third electronic device, and which is for providing the IVI service through an output device (e.g., a display or speaker) embedded in the vehicle.

In various embodiments, the second electronic device 102 may be referred to as a head unit or main unit in the present disclosure, being embedded in a vehicle. In various embodiments, the second electronic device 102 may be referred to as an IVI system in the present disclosure, providing an IVI service.

In various embodiments, the first electronic device 101 may include a processor (e.g., including processing circuitry) 120, a memory 130, and communication circuitry 190. In various embodiments, the processor 120 may include the processor 120 shown in FIG. 1, and the memory 130 may include the memory 130 shown in FIG. 1, and the communication circuitry 190 may include the communication module 190 shown in FIG. 1, and a connector 178 may include the connector 178 shown in FIG. 1.

In various embodiments, the processor 120 may include various processing circuitry and execute a plurality of operating systems (OS) using a hypervisor stored in the memory 130. Each of the plurality of operating systems may be referred to as system software in the present disclosure. For example, the processor 120 may execute a first system software stored in the memory 130 using the hypervisor. In various embodiments, the first system software may be installed in both the first electronic device 101 and the second electronic device 102. In various embodiments, the first system software installed in the second electronic device 102 may be used to control at least one hardware (e.g., an input device (e.g., a rotational structure (e.g., the input device 230), a physical button (e.g., the input device 230)) embedded in the vehicle) in the vehicle, a display (e.g., a touch screen (e.g., the first display 240)) embedded in the vehicle, a cluster display (e.g., the second display 245), and/or a communication device (e.g., a USB connector, a Bluetooth communication circuitry, and/or a Wi-Fi communication circuitry (e.g., the communication circuitry 250), etc.) embedded in the vehicle. For example, the first system software may include Linux™. In various embodiments, the first system software installed in the first electronic device 101 may be used to control the second system software installed only in the first electronic device 101. For another example, the processor 120 may execute the second system software stored in the memory 130 using the hypervisor. In various embodiments, the second system software may be distinct from the first system software. For example, the second system software may include quenix (QNX)™. In various embodiments, the second system software may be distinct from a third system software which is installed only in the second electronic device 102 or is installed in both the first electronic device 101 and the second electronic device 102. In various embodiments, the third system software may refer, for example, to system software which is used to provide an IVI service in the vehicle while the second electronic device 102 operates independently from the first electronic device 101. For example, the third system software may include iOS™, Android™, or Windows™.

In various embodiments, the processor 120 may migrate information about a first virtual machine from the second electronic device 102 to the first electronic device 101 through the communication circuitry 190. In various embodiments, the first virtual machine may refer, for example, to a virtual machine which is executed on the third system software installed in the second electronic device 102. In various embodiments, to provide the IVI service in the vehicle, the first virtual machine may be executed in the second electronic device 102. In various embodiments, the information about the first virtual machine may include a state of the memory 220 of the second electronic device 102 associated with the first virtual machine, a state of the processor 210 of the second electronic device 102 associated with the first virtual machine, a state of the input device (e.g., including input circuitry) 230 of the second electronic device 102 associated with the first virtual machine, a state of the first display 240, a state of the second display 245, information about a storage position of the memory 220 of the second electronic device 102, or a combination thereof. In various embodiments, the information about the first virtual machine may be used to execute the first virtual machine in the first electronic device 101. In various embodiments, the migrating of the information about the first virtual machine may be performed using the first system software.

In various embodiments, the processor 120 may execute the first virtual machine in the first electronic device 101 by resuming the first virtual machine having been executed in the second electronic device 102 using a projection protocol provided by the communication circuitry 190, based on the migration. In various embodiments, the projection protocol may be supported to exchange data of an input (e.g., a touch input, a rotational input, and/or a push input of a physical button) to an input device embedded in a vehicle, audio data (e.g., 5.1-channel audio data), and/or video data (e.g., H.264 video data) or a combination thereof, between the first electronic device 101 and the second electronic device 102. The projection protocol may operate based on high speed network connection such as USB and Ethernet.

In various embodiments, the processor 120 may acquire data about at least one first visual object from the information about the first virtual machine executed in the first electronic device 101. In various embodiments, the data about the at least one first visual object may be acquired using the first system software. In various embodiments, the at least one first visual object may be an object included in a screen that will be displayed on a display (e.g., the first display 240 and/or the second display 245) embedded in a vehicle through the second electronic device 102. For example, the at least one first visual object may include an executable icon which may be displayed on the first display 240 or the second display 245 and may, for example, be for providing a function in the vehicle, an image which is displayed on the first display 240 or the second display 245 and may, for example, be for providing information, a notification which is displayed on the first display 240 or the second display 245 and may, for example, be for notifying an event in the vehicle, or a combination thereof. In various embodiments, the at least one first visual object may be an object which is provided by the first virtual machine executed on the third system software in the second electronic device 102. In various embodiments, the at least one first visual object may be an object which is provided on the display embedded in the vehicle while the second electronic device 102 operates independently from the first electronic device 101. However, an embodiment is not limited to this.

In various embodiments, the processor 120 may acquire data about at least one second visual object from information about a second virtual machine executed on the second system software. In various embodiments, the data about the at least one second visual object may be acquired using the first system software. In various embodiments, the at least one second visual object may refer, for example, to an object which is providable through only the first electronic device 101 among the first electronic device 101 and the second electronic device 102. For example, the at least one second visual object may include an executable icon, an image, or a combination thereof. In various embodiments, the at least one second visual object may be an object provided by the second virtual machine executed on the second system software installed in the first electronic device 101 among the first electronic device 101 and the second electronic device 102. However, an embodiment is not limited to this.

In various embodiments, the processor 120 may acquire information about a screen which includes the at least one first visual object and the at least one second visual object. For example, by composing the at least one first visual object and the at least one second visual object through the first system software, and configuring the screen which includes the at least one first visual object and the at least one second visual object based on the composing, the processor 120 may acquire the information about the screen.

In various embodiments, to display the screen on a display (e.g., the first display 240 or the second display 245) in a vehicle constructed integrally with the second electronic device 102 or operatively coupled with the second electronic device 102, the processor 120 may transmit the information about the screen to the second electronic device 102 through the communication circuitry 190.

In various embodiments, the processor 120 may receive information about a user input, which is received through a display (e.g., the first display 240, the second display 245 or a combination thereof) associated with the second electronic device 102 from the second electronic device 102 displaying the screen, from the second electronic device 102, using the communication circuitry 190. The information about the user input may be received using the first system software.

In various embodiments, based on the information about the user input, the processor 120 may identify that the user input corresponds to the at least one first visual object or the at least one second visual object. In various embodiments, the identifying may be performed by the first system software. For example, in response to the user input corresponding to the at least one first visual object, the processor 120 may execute a function associated with the at least one first visual object in the migrated first virtual machine, and transmit information about the executed function to the second electronic device 102 through the communication circuitry 190. Based on the information about the function, the second electronic device 102 may alter at least part of a screen of the display (e.g., the first display 240 or the second display 245 or a combination thereof) associated with the second electronic device 102. For example, based on the information about the function, the second electronic device 102 may display another screen overlapped with the screen, or display another screen converted from the screen. For another example, in response to the user input corresponding to the at least one second visual object, the processor 120 may execute a function associated with the at least one second visual object in the second virtual machine, and transmit information about the executed function to the second electronic device 102 through the communication circuitry 190. Based on the information about the function, the second electronic device 102 may alter at least part of a screen of the display (e.g., the first display 240, the second display 245 or a combination thereof) associated with the second electronic device 102. For example, based on the information about the function, the second electronic device 102 may display another screen overlapped with the screen, or display another screen converted from the screen. However, an embodiment is not limited to this.

In various embodiments, the second electronic device 102 may include the processor (e.g., including processing circuitry) 210, the memory 220, the input device (e.g., including input circuitry) 230, the first display 240, the second display 245, the communication circuitry 250, and the connector 260. In various embodiments, the processor 210 may include the processor 120 illustrated in FIG. 1, and the memory 220 may include the memory 130 illustrated in FIG. 1, and the input device 230 may include the input device 150 illustrated in FIG. 1, and the first display 240 may include the display device 160 illustrated in FIG. 1, and the second display 245 may include the display device 160 illustrated in FIG. 1, and the communication circuitry 250 may include the communication module 190 illustrated in FIG. 1, and the connector 260 may include the connector 178 illustrated in FIG. 1. In various embodiments, the input device 150 may include various input circuitry, such as, for example, and without limitation, a rotational input structure installed in a vehicle, a physical button structure, a microphone installed in the vehicle, a touch circuitry in a display installed in a head unit, a combination thereof, or the like. However, an embodiment is not limited to this. In various embodiments, the first display 240 may refer, for example, to a touch screen installed in a head unit in the vehicle, and the second display 245 may refer, for example, to a cluster display or head up display (HUD) installed in a dashboard in the vehicle. However, an embodiment is not limited to this. For example, the first display 240 and the second display 245 may be implemented as one touch screen as well.

In various embodiments, based on obtaining (e.g., determining) that a selected or specified event occurs, the processor 210 may execute a plurality of system software using a hypervisor stored in the memory 220. For example, based on obtaining that the selected event occurs, the processor 210 may execute the first system software stored in the memory 220 using the hypervisor. In various embodiments, the first system software installed in the second electronic device 102 may be used to control at least one hardware in the vehicle (e.g., an input device embedded in the vehicle (e.g., a rotational structure (e.g., the input device 230) and a physical button (e.g., the input device 230)), a display embedded in the vehicle (e.g., a touch screen (e.g., the first display 240), a cluster display (e.g., the second display 245)), and/or a communication device embedded in the vehicle (e.g., a USB connector, a Bluetooth communication circuitry, and/or a Wi-Fi communication circuitry (e.g., the communication circuitry 250), etc.). In various embodiments, the first system software may be used to control the third system software installed in the second electronic device 102.

In various embodiments, in response to obtaining (or determining) that the selected event occurs, the processor 210 may migrate information about the first virtual machine executed on the third system software, to the first electronic device 101, using the communication circuitry 250. In various embodiments, an example of the selected event will be described in greater detail below with reference to FIG. 11A, FIG. 11B and FIG. 11C, for example. The migrating of the information about the first virtual machine may be performed using the first system software installed in the second electronic device 102.

In various embodiments, the processor 210 may receive information about a screen that will be displayed on a display (e.g., the first display 240, the second display 245, or a combination thereof), from the first electronic device 101 through the communication circuitry 250. In various embodiments, the information about the screen may be received using the first system software. In various embodiments, the information about the screen may include data about the at least one first visual object and data about the at least one second visual object. The data about the at least one first visual object may be acquired from the information about the first virtual machine executed in the first electronic device 101 by the migration, and the data about the at least one second visual object may be acquired from the information about the second virtual machine executed in the first electronic device 101 after the migration.

In various embodiments, the processor 210 may display the screen including the at least one first visual object and the at least one second visual object on a display (e.g., the first display 240, the second display 245, or a combination thereof).

In various embodiments, while displaying the screen, the processor 210 may receive a user input to the screen through the input device 230, and transmit information about the received user input to the first electronic device 101 through the communication circuitry 250. For example, in response to the user input being a touch input, the information about the user input may include, for example, and without limitation, information about a position of receiving the touch input, a strength of a push of the touch input, an attribute (e.g., a single tap or double tap) of the touch input, a drag length of the touch input, a combination thereof, or the like. For another example, in response to the user input being a rotational input to a rotational structure, the information about the user input may include information about an extent in which the rotational structure is rotated by the user input, information about the kind of the rotational structure, or a combination thereof. For further another example, in response to the user input being a push input to a physical button, the information about the user input may include information about the number of push, information about the kind of the physical button for triggering the push, or a combination thereof. However, an embodiment is not limited to this.

In various embodiments, the processor 210 may receive information about a function corresponding to the user input from the first electronic device 101 through the communication circuitry 250 and, based on the received information about the function, the processor 210 may alter at least part of the screen of the display (e.g., the first display 240, the second display 245, or a combination thereof) associated with the second electronic device 102. For example, the processor 210 may display another screen overlapped with the screen, or display another screen converted from the screen. However, an embodiment is not limited to this.

Figure 3:
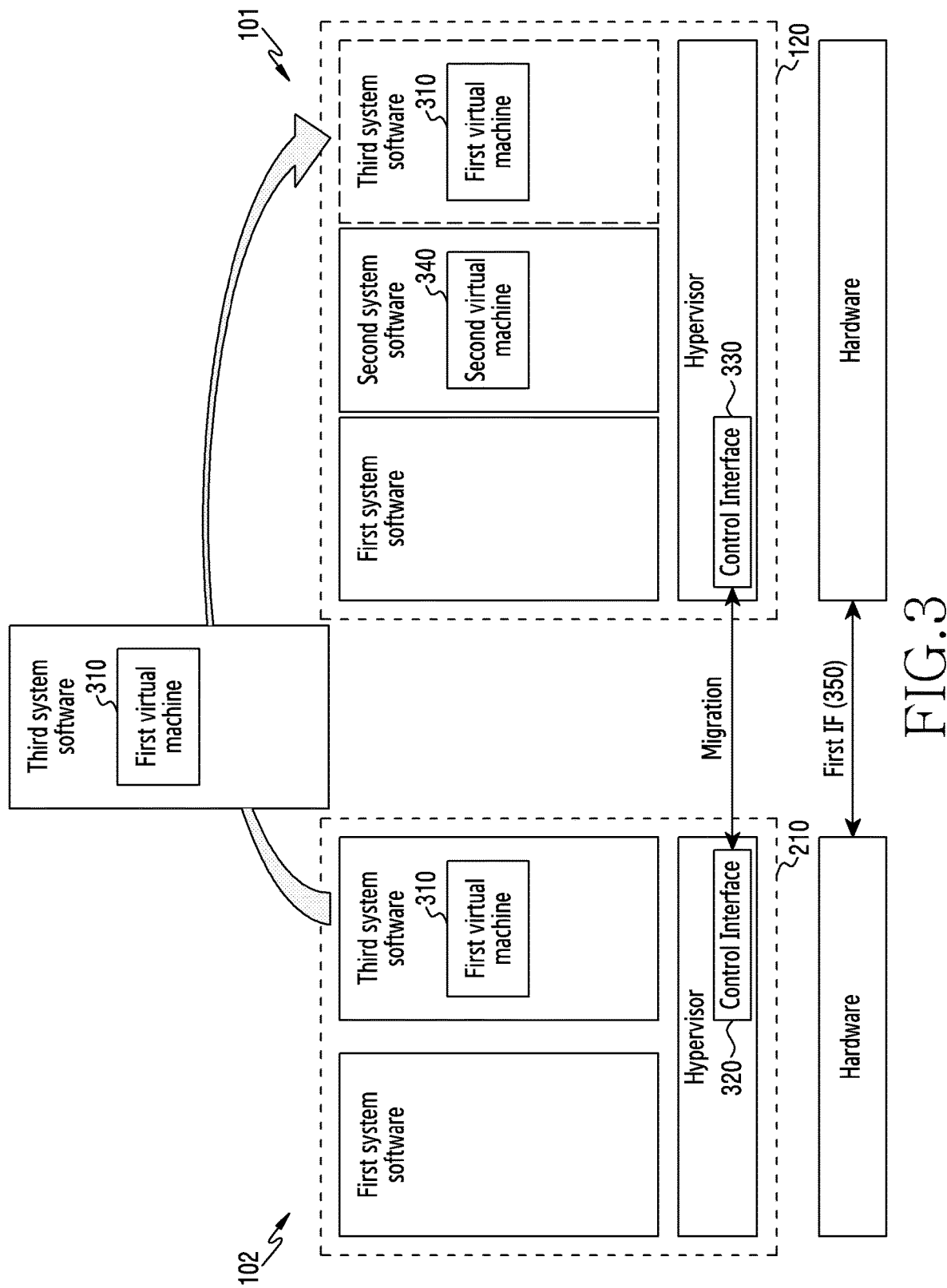
FIG. 3 is a diagram illustrating an example of first migration from a second electronic device to a first electronic device according to various embodiments.

FIG. 3 is a diagram illustrating an example of first migration from a second electronic device to a first electronic device according to various embodiments.

Referring to FIG. 3, in response to obtaining (e.g., determining) that the selected event occurs, the processor 210 may migrate information 310 about the first virtual machine executed on the third system software, from the second electronic device 102 to the first electronic device 101. For example, by controlling through the first system software a control interface 320 of the hypervisor for executing the first system software and the third system software, the processor 210 may transmit the information 310 about the first virtual machine from the second electronic device 102 to the first electronic device 101. In various embodiments, the control interface 320 may be included to process the information 310 about the first virtual machine. For example, using the control interface 320, the processor 210 may acquire the information 310 about the first virtual machine, and transmit the information 310 about the first virtual machine to the electronic device 101. The information 310 about the first virtual machine may include, for example, and without limitation, data about a state of the memory 220 associated with the first virtual machine, data about a state of the processor 210 associated with the first virtual machine, etc. In various embodiments, the information 310 about the first virtual machine transmitted to the first electronic device 101 may further include data of the first virtual machine (for example, at least part of the first virtual machine) that is being executed in the first electronic device 101. The processor 120 of the first electronic device 101 may receive the information 310 about the first virtual machine, and alter a state of the memory 130 using, for example, and without limitation, the data about the state of the memory 220 associated with the first virtual machine, the data about the state of the processor 210 associated with the first virtual machine, the data about the state of the input/output device associated with the first virtual machine, and data of the first virtual machine. According to an embodiment, the processor 120 of the first electronic device 101 may migrate the information 310 about the first virtual machine from the second electronic device 102, by installing the first virtual machine in the first electronic device 101 using the data of the first virtual machine included in the information 310 about the first virtual machine. According to an embodiment, as migrating the information 310 about the first virtual machine from the second electronic device 102, the processor 120 may at least temporarily inactivate at least part (for example, at least part of the third system software) of the second electronic device 102. In various embodiments, the first system software may be system software having the authority of access to all hardware in the vehicle, whereas the third system software may be system software not having the authority of access to part of the hardware. The migrating of the information about the first virtual machine may be performed through a first interface (IF) 350. The first interface (IF) 350 may support a physical connection between the first electronic device 101 and the second electronic device 102, and support a migration and projection protocol. For example, the first interface 350 may be a USB connector.

The processor 120 may receive the information 310 about the first virtual machine transmitted from the second electronic device 102. In various embodiments, the processor 120 may receive the information 310 about the first virtual machine from the second electronic device 102, by controlling through the first system software a control interface 330 of the hypervisor for executing the first system software, the second system software, and the third system software. In various embodiments, unlike the first system software, the second system software may be system software installed only in the first electronic device 101 among the first electronic device 101 and the second electronic device 102. In various embodiments, the first system software executable in the first electronic device 101 may be system software having the authority of access to at least one hardware in the vehicle, whereas the second system software and the third system software executable in the first electronic device 101 may be system software not having the authority of access to the at least one hardware. In various embodiments, the processor 120 may execute the first virtual machine on the third system software, by controlling the hypervisor through the first system software.

In various embodiments, the processor 120 may acquire information 340 about the second virtual machine, in association with the migrating. For example, the processor 120 may acquire the information 340 about the second virtual machine executed on the second system software, by controlling the hypervisor through the first system software. In various embodiments, the information 340 about the second virtual machine may be acquired to obtain a visual object (e.g., at least one second visual object to be described later) required to configure a screen that will be transmitted to the second electronic device 102.

In various embodiments, the processor 120 may acquire data about at least one first visual object from the migrated information 310 about the first virtual machine, and acquire data about at least one second visual object from the information 340 about the second virtual machine.

In various embodiments, to display the screen which includes the at least one first visual object and the at least one second visual object on the display (e.g., the first display 240, the second display 245, or a combination thereof) of the second electronic device 102 based on the data about the at least one first visual object and the data about the at least one second visual object, the processor 120 may transmit information about the screen to the second electronic device 102 through the first interface 350. Various embodiments thereof will be described in greater detail below with reference to FIG. 4, for example.

Figure 4:
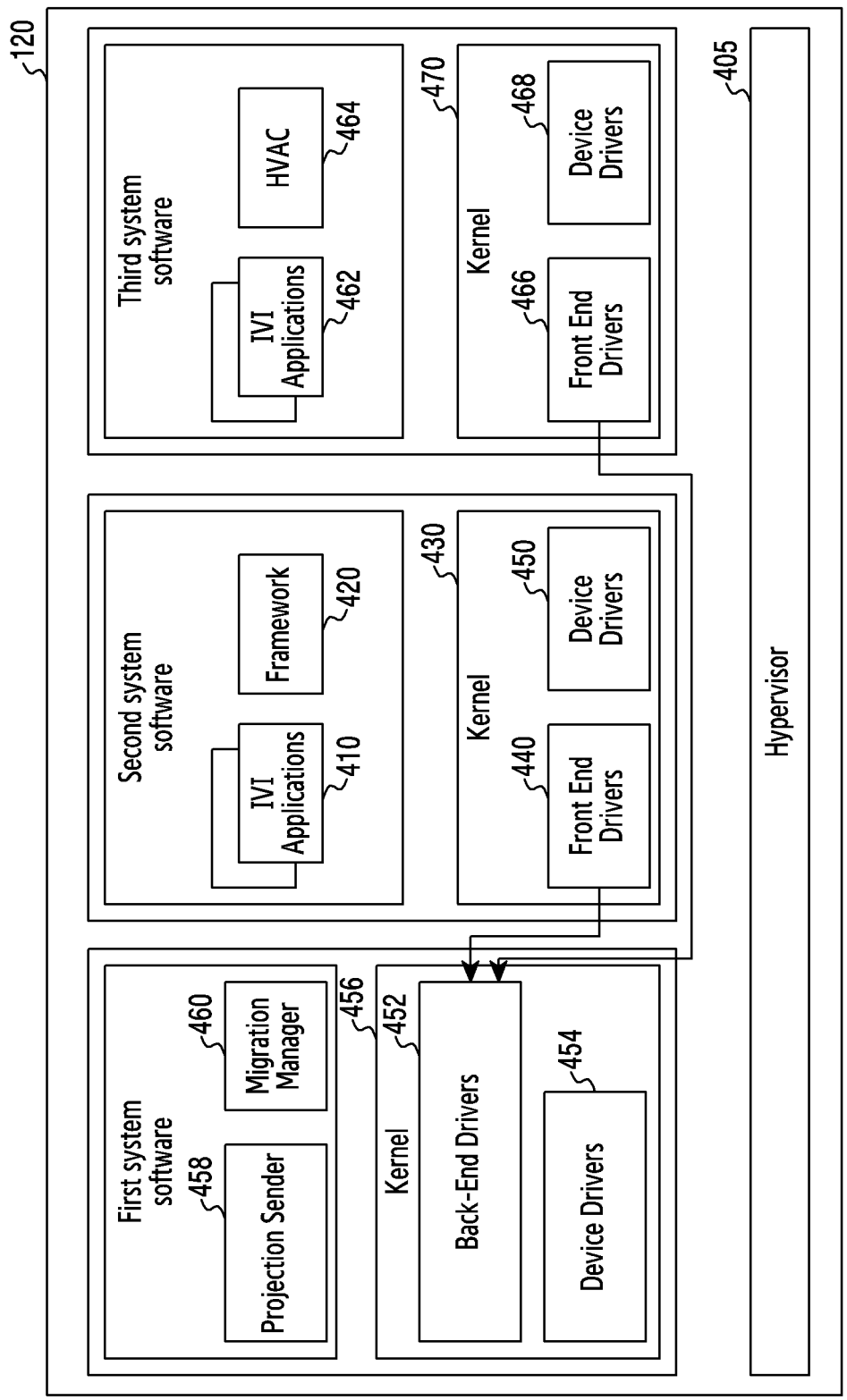
FIG. 4 is a diagram illustrating an example configuration of a processor of a first electronic device for processing first migration from a second electronic device to the first electronic device according to various embodiments.

FIG. 4 is a diagram illustrating an example functional configuration of a processor of a first electronic device for processing first migration from a second electronic device to the first electronic device according to various embodiments. This functional configuration may be included in the processor 120 of the first electronic device 101 illustrated in FIG. 2.

Referring to FIG. 4, the processor 120 of various embodiments may control the first system software, the second system software, and the third system software using a hypervisor 405. Using a kernel 430 including front-end drivers 440 and device drivers 450, the processor 120 may provide data about the at least one second visual object acquired from the information about the second virtual machine which is executed on the second system software based on IVI applications 410, from the front-end drivers 440 to back-end drivers 452 of a kernel 456. The second system software may include the IVI applications 410 and a framework (e.g., an Android framework) 420. The kernel 456 may be associated with the first system software and include the back-end drivers 452 and device drivers 454. The data about the at least one second visual object provided to the back-end drivers 452 of the kernel 456 may be transmitted to the second electronic device 102 through a projection sender 458 in the first system software.

According to various embodiments, using a kernel 470 including front-end drivers 466 and device drivers 468, the processor 120 may provide data about the at least one first visual object acquired from the information about the first virtual machine which is executed on the third system software based on IVI applications 462 migrated through a migration manager 460 in the first system software, from front-end drivers 466 to the back-end drivers 452 of the kernel 456 associated with the first system software. The third system software may include the IVI applications 462 and a heating, ventilating, and air conditioning (HVAC) 464. The data about the at least one first visual object provided to the back-end drivers 452 of the kernel 456 may be transmitted to the second electronic device 102 through the projection sender 458 in the first system software. Various embodiments thereof will be described in greater detail below with reference to FIG. 5, for example.

Figure 5:
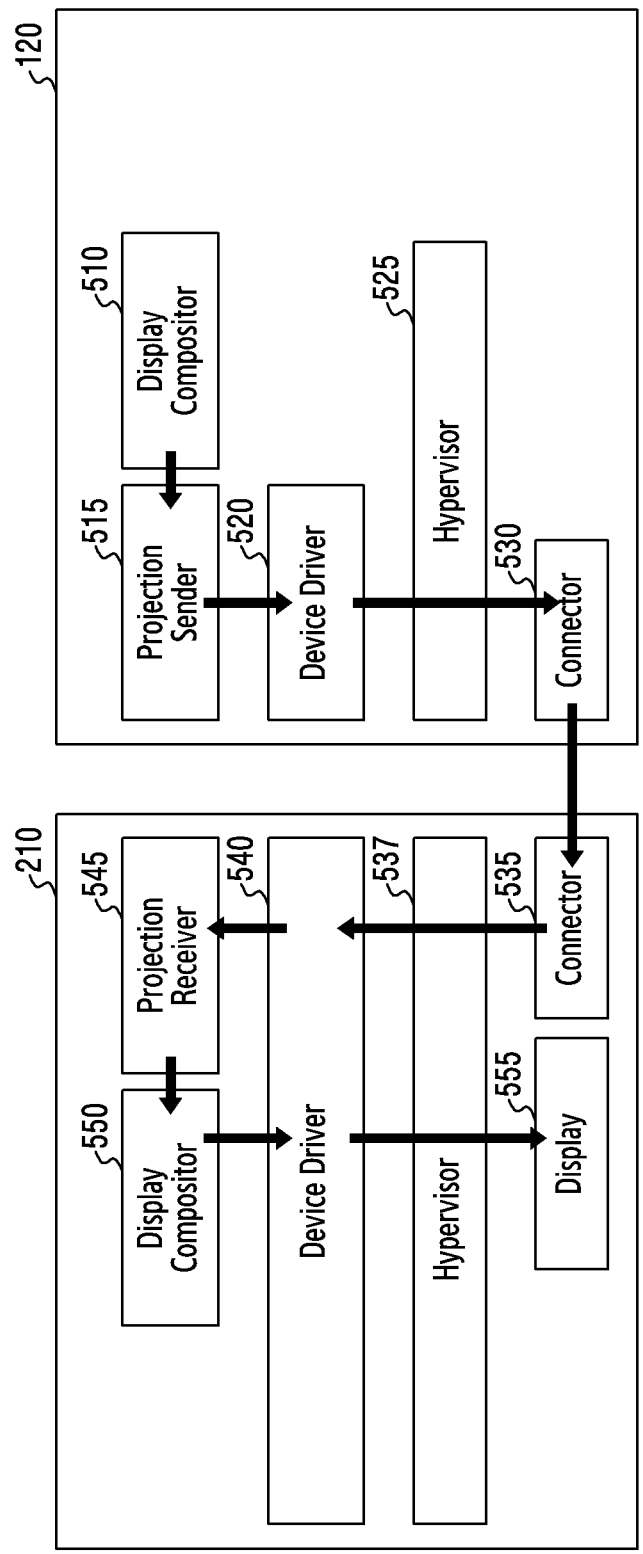
FIG. 5 is a diagram illustrating an example configuration of a processor of a first electronic device and a processor of a second electronic device for processing first migration from the second electronic device to the first electronic device according to various embodiments.

FIG. 5 is a diagram illustrating an example functional configuration of a processor of a first electronic device and a processor of a second electronic device for processing first migration from the second electronic device to the first electronic device according to various embodiments. These functional configurations may be included in the processor 120 of the first electronic device 101 and the processor 210 of the second electronic device 102.

Referring to FIG. 5, the processor 120 may acquire the screen by composing the at least one first visual object and the at least one second visual object through a display compositor 510 included in the first system software, and provide information about the screen to a projection sender 515 (e.g., the projection sender 458) included in the first system software. The first system software may be controlled using a hypervisor 525 (e.g., the hypervisor 405). The projection sender 515 may provide the information about the screen to a device driver 520 (e.g., the device drivers 454) that is controlled using the hypervisor 525. The device driver 520 may transmit the information about the screen to a connector 530. The connector 530 may transmit the information about the screen to a connector 535 of the second electronic device 102. The connector 535 may provide the information about the screen, to the device driver 540 included in the first system software that is controlled using a hypervisor 537 of the second electronic device 102. The device driver 540 may provide the information about the screen to a projection receiver 545 included in the first system software that is controlled using the hypervisor 537 of the second electronic device 102. The projection receiver 545 may provide the information about the screen to a display compositor 550 included in the first system software that is controlled using the hypervisor 537 of the second electronic device 102. Based on the information about the screen, the display compositor 550 may configure the screen that will be displayed on the first display 240, the second display 245, or a combination thereof. To display the configured screen, the display compositor 550 may provide information about the configured screen to the device driver 540 included in the first system software that is controlled using the hypervisor 537 of the second electronic device 102. The configured screen may include the at least one first visual object and the at least one second visual object. By providing the information about the configured screen to a display 555 (e.g., the first display 240, the second display 245, or a combination thereof), the device driver 540 may display the screen including the at least one first visual object and the at least one second visual object. Various embodiments thereof will be described in greater detail below with reference to FIG. 6, for example.

Figure 6:
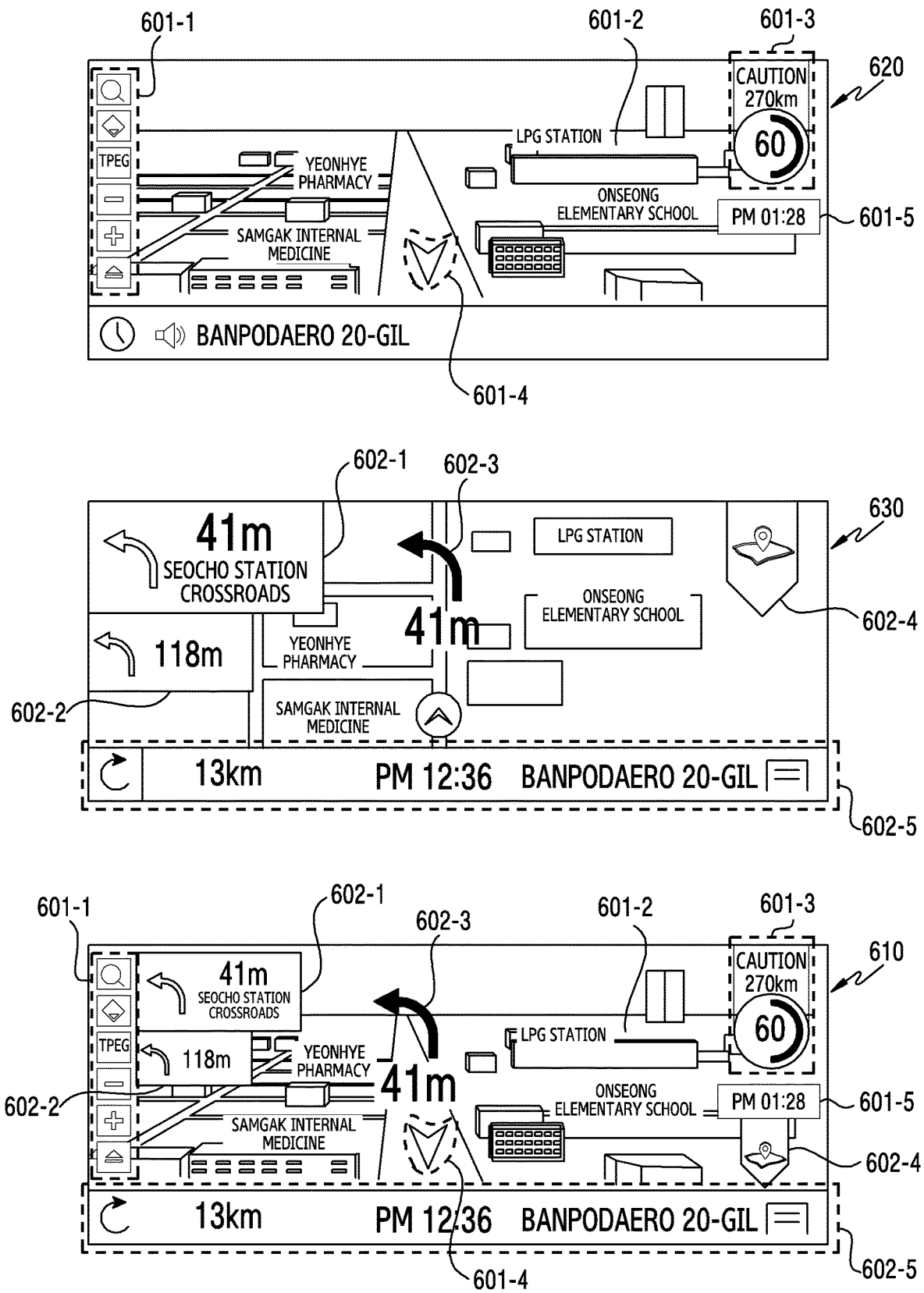
FIG. 6 is a diagram illustrating an example screen displayed in a second electronic device according to various embodiments.

FIG. 6 is a diagram illustrating an example screen displayed in a second electronic device according to various embodiments. This screen may be displayed on a display (e.g., the first display 240, the second display 245, or a combination thereof) of the second electronic device 102 illustrated in FIG. 2.

For example, referring to FIG. 6, the processor 210 may display a screen 610 on the display 555 (e.g., the first display 240, the second display 245, or a combination thereof). The screen 610 may include at least one first visual object 601-1, 601-2, 601-3, 601-4, 601-5 (which may be referred to hereinafter as 601-1 to 601-5) provided from a first virtual machine (e.g., the first virtual machine 310 of FIG. 3) and at least one second visual object 602-1, 602-2, 602-3, 602-4, 602-5 (which may be referred to hereinafter as 602-1 to 602-5) provided from a second virtual machine. For example, the at least one first visual object 601-1 to 601-5 may be a visual object configuring a screen 620 which is displayed using only the first virtual machine among the first virtual machine and the second virtual machine. The arrangement of at least some of the at least one first visual object 601-1 to 601-5 in the screen 610 may be different from the arrangement in the screen 620. For example, the at least one second visual object 602-1 to 602-5 may be a visual object configuring a screen 630 which is displayed using only the second virtual machine among the first virtual machine and the second virtual machine. The arrangement of at least some of the at least one second visual object 602-1 to 602-5 in the screen 610 may be different from the arrangement in the screen 630. By performing composition through a display compositor (e.g., the display compositor 550 of FIG. 5), the processor 210 may display the screen 610 including the at least one first visual object and the at least one second visual object. However, an embodiment is not limited to this.

According to various embodiments, while displaying the screen 610, the processor 210 may receive a user input to at least part of the screen 610. Various embodiments thereof will be described in greater detail below with reference to FIG. 7, for example.

Figure 7:
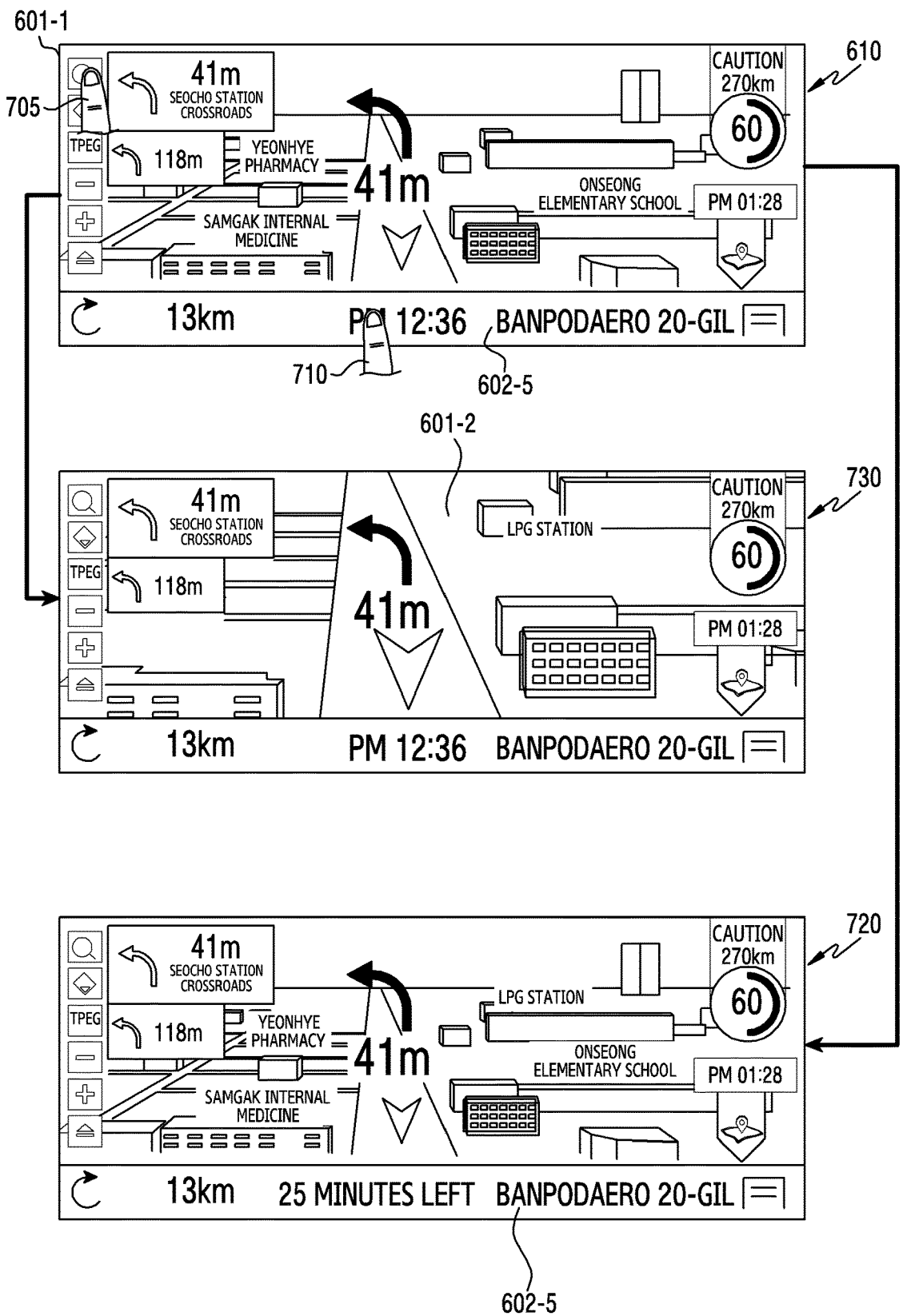
FIG. 7 is a diagram illustrating an example screen altered by a user input received by a second electronic device according to various embodiments.

FIG. 7 is a diagram illustrating an example screen altered by a user input received by a second electronic device according to various embodiments. This screen may be displayed on a display (e.g., the first display 240, the second display 245, or a combination thereof) of the second electronic device 102 illustrated in FIG. 2.

For example, referring to FIG. 7, while displaying the screen 610, the processor 210 may receive a user input 705 to the at least one first visual object 601-1 or receive a user input 710 to the at least one second visual object 602-5. Based on receiving a user input (e.g., the user input 705 or the user input 710), the processor 210 may transmit information about the user input to the first electronic device 101. The processor 120 of the first electronic device 101 receiving the information about the user input may identify a visual object corresponding to the user input among the at least one first visual object and the at least one second visual object, and execute a function associated with the identified visual object. For example, based on identifying that the user input 705 corresponds to the at least one first visual object 601-1, the processor 120 of the first electronic device 101 may execute a function associated with the at least one first visual object 601-1 in the first virtual machine migrated from the second electronic device 102, and transmit information about the function executed in the first virtual machine, to the second electronic device 102. For another example, based on identifying that the user input corresponds to the at least one second visual object 602-5, the processor 120 of the first electronic device 101 may execute a function associated with the at least one second visual object 602-5 in the second virtual machine, and transmit information about the function executed in the second virtual machine, to the second electronic device 102.

Various embodiments thereof will be described in greater detail below with reference to FIG. 8, for example.

Figure 8:
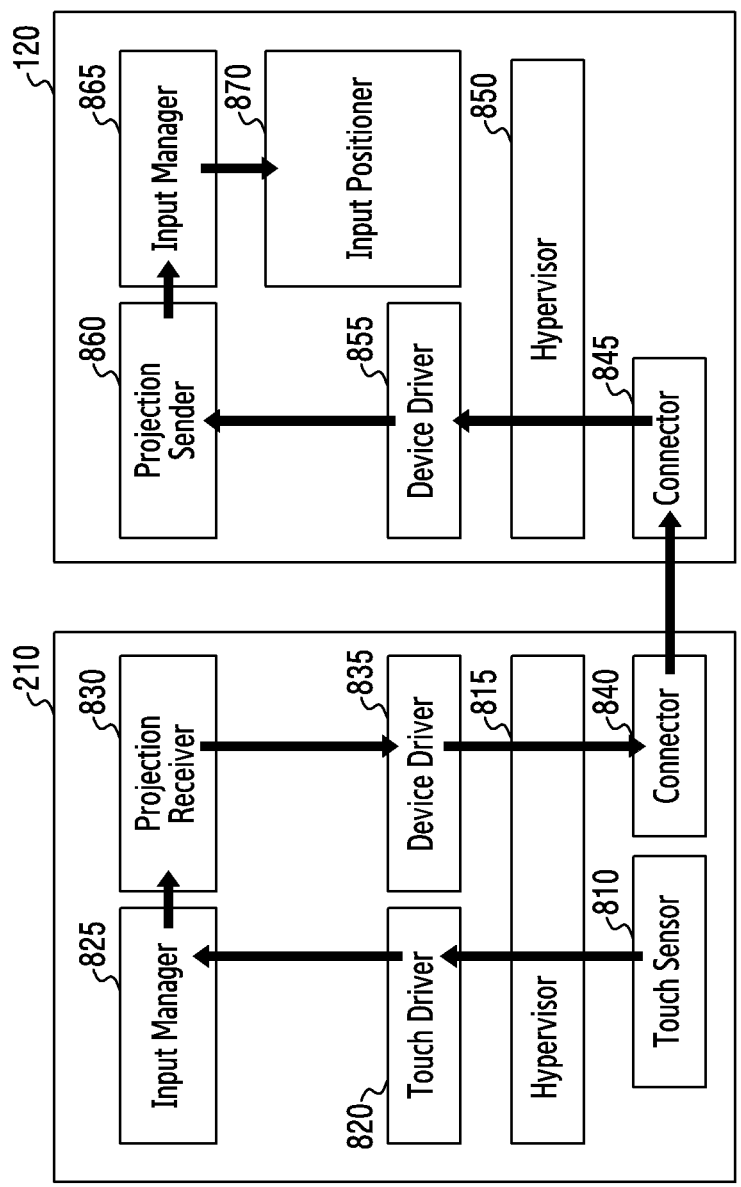
FIG. 8 is a diagram illustrating an example configuration of processors of a first electronic device and a second electronic device for processing a user input received by the second electronic device according to various embodiments.

FIG. 8 is a diagram illustrating an example functional configuration of processors of a first electronic device and a second electronic device for processing a user input received by the second electronic device according to various embodiments. These functional configurations may be included in the processor 120 of the first electronic device 101 illustrated in FIG. 2, and the processor 210 of the second electronic device 102 illustrated in FIG. 2.

For example, referring to FIG. 8, while displaying the screen on the first display 240, the second display 245, or a combination thereof, the processor 210 may receive the user input using the input device 230. For example, using a touch sensor 810 included in the input device 230, the processor 210 may receive a touch input as the user input. Through a touch driver 820 included in the first system software that is controlled using a hypervisor 815 (e.g., the hypervisor 537), the touch sensor 810 may provide information about the touch input, to an input manager 825 included in the first system software that is controlled using the hypervisor 815. The input manager 825 may provide the information about the touch input, to a projection receiver 830 (e.g., the projection receiver 545) included in the first system software that is controlled using the hypervisor 815. The projection receiver 830 may provide the information about the touch input, to a device driver 835 included in the first system software that is controlled using the hypervisor 815. The device driver 835 may provide the information about the touch input, to a connector 840 (e.g., the connector 535). The connector 840 may transmit the information about the touch input, to a connector 845 (e.g., the connector 530) of the first electronic device 101. The connector 845 may provide the information about the touch input, to a device driver 855 (e.g., the device driver 520) included in the first system software that is controlled using the hypervisor 850 (e.g., the hypervisor 525). The device driver 855 may provide the information about the touch input, to a projection sender 860 (e.g., the projection sender 515) included in the first system software that is controlled using the hypervisor 850. The projection sender 860 may provide the information about the touch input, to an input manager 865 included in the first system software that is controlled using the hypervisor 850. The input manager 865 may acquire data about a position of receiving the touch input, from the information about the touch input, and provide the acquired data to an input positioner 870 included in the first system software that is controlled using the hypervisor 850. Based on the data, the input positioner 870 may identify a function associated with the touch input. For example, the input positioner 870 may identify that the user input 705 corresponds to the function associated with the at least one first visual object 601-1, and provide the identifying result to the processor 120. For another example, the input positioner 870 may identify that the user input 710 corresponds to the function associated with the at least one second visual object 602-5, and provide the identifying result to the processor 120. Based on the identifying result, the processor 120 may execute the function in the first virtual machine or the second virtual machine, and transmit information about the executed function to the second electronic device 102 through operations exemplified through FIG. 5. Based on the information about the function, the second electronic device 102 may alter a screen that is being displayed into another screen, or update the screen that is being displayed. For example, referring to FIG. 7, the processor 210 may display a screen 730 including an extended first visual object 601-2, based on the information about the function that is received from the first electronic device 101 in response to transmitting the information about the user input 705 to the first electronic device 101. For another example, referring to FIG. 7, the processor 210 may display a screen 720 including a second visual object 602-5 having at least partially altered visual element, based on the information about the function that is received from the first electronic device 101 in response to transmitting the information about the user input 705 to the first electronic device 101.

As described above, the first electronic device 101 and the second electronic device 102 of various embodiments may improve severed usability, based on the migrating of a first virtual machine from the second electronic device 102 to the first electronic device 101 and the projection of information from the first electronic device 101 to the second electronic device 102. In other words, the first electronic device 101 and the second electronic device 102 of various embodiments may provide an enhanced user experience, based on the migrating of the first virtual machine from the second electronic device 102 to the first electronic device 101 and the projection of information from the first electronic device 101 to the second electronic device 102.

An electronic device (e.g., the first electronic device 101) of various example embodiments as described above may include a housing, a connector (e.g., the communication circuitry 190) configured to be exposed through the housing, and to be connected to an in-vehicle infotainment (IVI) system (e.g., the second electronic device 102), a processor (e.g., the processor 120) positioned in the housing and operatively connected with the connector, and a memory (e.g., the memory 130) positioned in the housing and operatively connected with the processor. The memory may include a first operating system (OS), a hypervisor configured to execute the first operating system, and instructions. When being executed in a state of where the processor is connected to the IVI system through the connector, the instructions may cause the processor to control the electronic device to: receive state information about the IVI system through the connector, receive at least part of a second operating system of the IVI system through the connector, install the at least part of the second operating system so as to execute on the hypervisor, cause the IVI system to be inactivated, execute the first operating system and the second operating system on the hypervisor using at least part of the state information, and provide data resulting from operations of the first operating system and the second operating system to the IVI system through the connector.

In various example embodiments, the instructions when executed by the processor, may control the electronic device to render an image that will be displayed on the IVI system, and the image may include a first portion provided by the first operating system and a second portion provided by the second operating system.

In various example embodiments, the memory may further include a first application program (e.g., a first virtual machine) compatible with the first operating system, and the first portion may be provided using the first application program.

In various example embodiments, the first operating system may be installed only in the electronic device among the electronic device and the IVI system.

In various example embodiments, the instructions when executed by the processor, may control the electronic device to: receive, through the connector, information about an input received through a display of the IVI system, from the IVI system displaying a screen on the display of the IVI system based on the data, and identify that the input is associated with the first operating system based on the information about the input, acquire information about a function corresponding to the input using the first operating system executed on the hypervisor based on the identifying, and transmit the information about the function to the IVI system through the connector.

In various example embodiments, the instructions when executed by the processor, may control the electronic device to: receive, through the connector, information about an input received through a display of the IVI system from the IVI system displaying a screen on the display of the IVI system based on the data, identify that the input is associated with the second operating system based on the information about the input, acquire information about a function corresponding to the input using the second operating system executed on the hypervisor based on the identifying, and transmit the information about the function to the IVI system through the connector.

An electronic device (e.g., the first electronic device 101) connectable to another electronic device (e.g., the second electronic device 102) embedded in a vehicle according to various embodiments as described above, may include a memory (e.g., the memory 130) configured to store a first system software and a second system software, communication circuitry (e.g., the communication circuitry 190), and at least one processor (e.g., the processor 120). The at least one processor may use the first system software to control the electronic device to: migrate information about a first virtual machine executed on a third system software installed in the another electronic device from the another electronic device to the electronic device through the communication circuitry, acquire data about at least one first visual object from the information about the first virtual machine, acquire data about at least one second visual object from information about a second virtual machine executed on the second system software, acquire information about a screen including the at least one first visual object and the at least one second visual object, and transmit the information about the screen to the another electronic device through the communication circuitry so that the screen is displayable on a display of the another electronic device.

In various example embodiments, the at least one processor may be configured to control the electronic device to: acquire, using the first system software, the information about the screen which includes the at least one first visual object and the at least one second visual object by composing the at least one first visual object and the at least one second visual object.

In various example embodiments, the first system software may be installed in both the electronic device and the another electronic device, and the second system software may be installed only in the electronic device among the electronic device and the another electronic device. In various example embodiments, the first system software installed in the another electronic device may be further used to control at least one hardware in the vehicle.

In various example embodiments, the at least one processor may be configured to control the electronic device to: receive, through the communication circuitry, information about an input received through the display of the another electronic device, from the another electronic device displaying the screen on the display of the another electronic device, identify that the input corresponds to the at least one first visual object based on the information about the input, execute a function associated with the at least one first visual object in the migrated first virtual machine using the first system software and based on the identifying, and transmit information about the function executed in the first virtual machine to the another electronic device through the communication circuitry using the first system software.

In various example embodiments, the at least one processor may be configured to control the electronic device to: receive, through the communication circuitry, information about an input received through the display of the another electronic device, from the another electronic device displaying the screen on the display of the another electronic device, identify that the input corresponds to the at least one second visual object based on the information about the input, execute a function associated with the at least one second visual object in the second virtual machine using the first system software and based on the identifying, and transmit information about the function executed in the second virtual machine to the another electronic device through the communication circuitry using the first system software.

An electronic device (e.g., the second electronic device 102) embedded in a vehicle, connectable with another electronic device (e.g., the first electronic device 101) according to various embodiments as described above, may include communication circuitry (e.g., the communication circuitry 250), a display (e.g., the first display 240 and/or the second display 245), a memory (e.g., the memory 220) configured to store a first system software and a second system software, and at least one processor (e.g., the processor 210). The at least one processor may be configured to control the electronic device to: migrate information about a first virtual machine executed on the second system software from the electronic device to the another electronic device through the communication circuitry using the first system software, receive information about a screen that will be displayed on the display, from the another electronic device through the communication circuitry using the first system software, display, on the display the screen including at least one first visual object acquired from the information about the first virtual machine and at least one second visual object acquired from information about a second virtual machine executed on a second system software installed in the another electronic device based on the receiving.

In various example embodiments, the first system software may be installed in both the electronic device and the another electronic device, and the third system software may be installed only in the electronic device. In various example embodiments, the first system software installed in the electronic device may be further used to control at least one hardware including the display in the vehicle.

In various example embodiments, the at least one processor may be further configured to control the electronic device to: receive an input to the screen that is being displayed on the display, transmit information about a position of receiving the input to the another electronic device through the communication circuitry, using the first system software, receive information about a function corresponding to the position of receiving the input from the another electronic device through the communication circuitry, and display another screen associated with the function on the display based on the information about the function. In various example embodiments, the another screen may be displayed together with the screen, or be converted from the screen.

In various example embodiments, the at least one processor may be configured to control the electronic device to: migrate the information about the first virtual machine executed on the second system software from the electronic device to the another electronic device through the communication circuitry using the first system software in response to receiving a first specified input.

In various example embodiments, the at least one processor may be further configured to control the electronic device to: receive a second specified input distinct from the first specified input before migrating the information about the first virtual machine to the another electronic device, acquire data about the at least one first visual object from the information about the first virtual machine executed on the third system software in response to receiving the second specified input, and display another screen including only the at least one first visual object among the at least one first visual object and the at least one second visual object based on the acquiring.

Figure 9A:
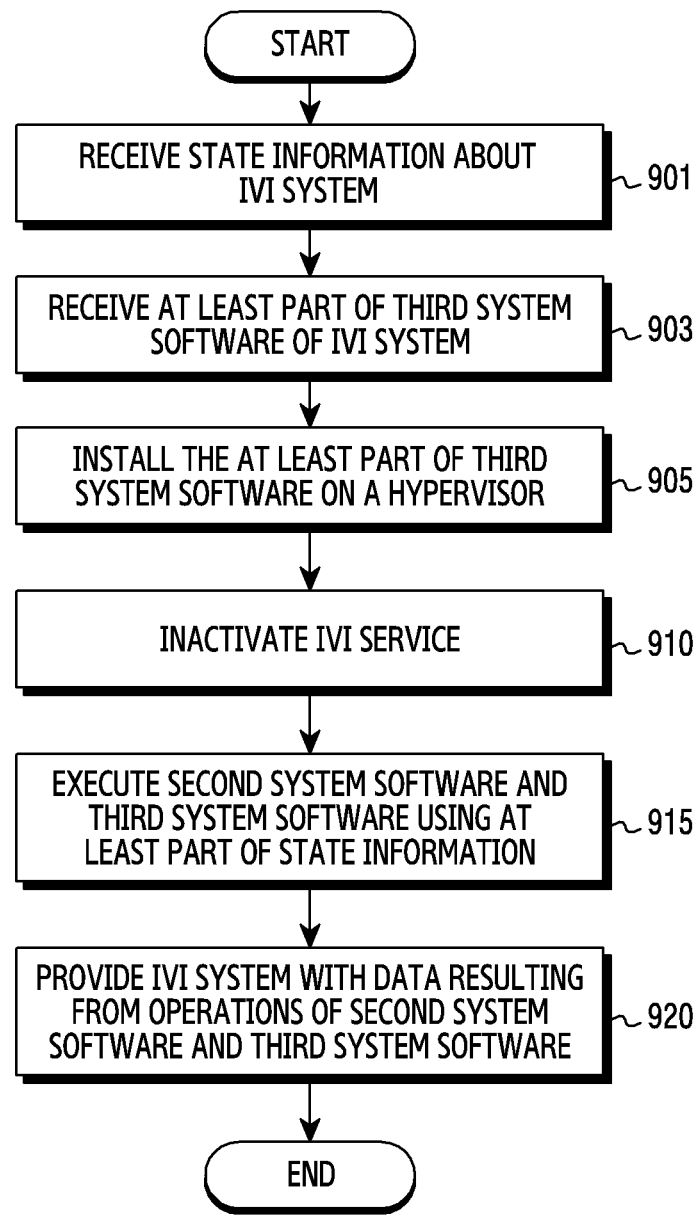
FIG. 9A is a flowchart illustrating an example operation of a first electronic device according to various embodiments.

FIG. 9A is a flowchart illustrating an example operation of a first electronic device according to various embodiments. This operation may be performed by the electronic device 101 shown in FIG. 1, the first electronic device 101 shown in FIG. 2, or the processor 120 included in the first electronic device 101.

Referring to FIG. 9A, in operation 901, the processor 120 of various embodiments may receive state information about an IVI system (e.g., the second electronic device 102) through the communication circuitry 190. In various embodiments, the state information about the IVI system may include, for example, and without limitation, data about a state of the memory 220 associated with the first virtual machine executed on the third system software in the IVI system, data about a state of a register of the processor 210 (e.g., a CPU) associated with the first virtual machine, data about a state of an input/output device associated with the first virtual machine, or a combination thereof. In various embodiments, based on connecting the first electronic device 101 to the IVI system, the state information may be received from the IVI system.

According to various embodiments, in operation 903, the processor 120 may receive at least part of the third system software of the IVI system, based on the receiving of the state information. For example, the at least part of the third system software may be received through at least part of migration.

In operation 905, the processor 120 may install the at least part of the third system software, in order to execute the third system software on a hypervisor for controlling a plurality of system software (e.g., the first system software, the second system software, the third system software, or a combination thereof) in the first electronic device 101.

In operation 910, the processor 120 may inactivate an IVI service that is provided by the execution of the third system software in the IVI system. For example, the processor 120 may control the IVI system to inactivate the IVI service provided by the execution of the third system software in the IVI system. For example, by transmitting a control signal to the IVI system through the communication circuitry 190, the processor 120 may inactivate the IVI service in the IVI system.

In various embodiments, unlike the illustration of FIG. 9A, operation 910 may be performed earlier than operation 905 as well, and may be performed in parallel with operation 905 as well. For example, operation 910 may be performed independently from operation 905.

In operation 915, the processor 120 may execute the second system software and the third system software, using at least part of the state information. For example, the processor 120 may execute the third system software migrated from the IVI system using the at least part of the state information, and acquire data about the at least one first visual object, based on information about the first virtual machine that is executed on the third system software using the at least part of the state information. The at least one first visual object may refer, for example, to a first portion of a screen that will be displayed in the IVI system. For example, the processor 120 may execute the second system software installed only in the first electronic device 101 among the first electronic device 101 and the IVI system, and acquire data about the at least one second visual object at least based on information about the second virtual machine executed on the second system software. The at least one second visual object may refer, for example, to a second portion of a screen that will be displayed in the IVI system.

In operation 920, the processor 120 may transmit, to the IVI system, data resulting from operations (or executions) of the second system software and the third system software. For example, to display a screen including the at least one first visual object (or a first portion) and the at least one second visual object (or a second portion) in the IVI system, the processor 120 may transmit the data to the IVI system through the communication circuitry 190 using a projection protocol. Based on acquiring the data, the IVI system may render the screen (or image). The rendered screen (or image) may include the at least one first visual object (or first portion) provided by the third system software and the at least one second visual object (or second portion) provided by the second system software.

Although not illustrated in FIG. 9A, the processor 120 may receive, through the communication circuitry 190, information about an input, e.g., a user input, received by the IVI system, from the IVI system displaying the screen based on the data. For example, the processor 120 may identify that the user input is associated with the third system software based on the information about the user input, and acquire information about a function corresponding to the user input using the third system software executed on the hypervisor based on the identifying, and transmit the acquired information about the function to the IVI system.

For another example, the processor 120 may identify that the user input is associated with the second system software based on the information about the user input, and acquire information about a function corresponding to the user input using the second system software executed on the hypervisor based on the identifying, and transmit the acquired information about the function to the IVI system. Based on the information about the function, the IVI system may update the displaying of the screen or convert the screen into another screen.

As described above, the first electronic device 101 and the IVI system of various embodiments may provide an enhanced user experience, using the migrating of information and the executing of the system software on the hypervisor.

Figure 9B:
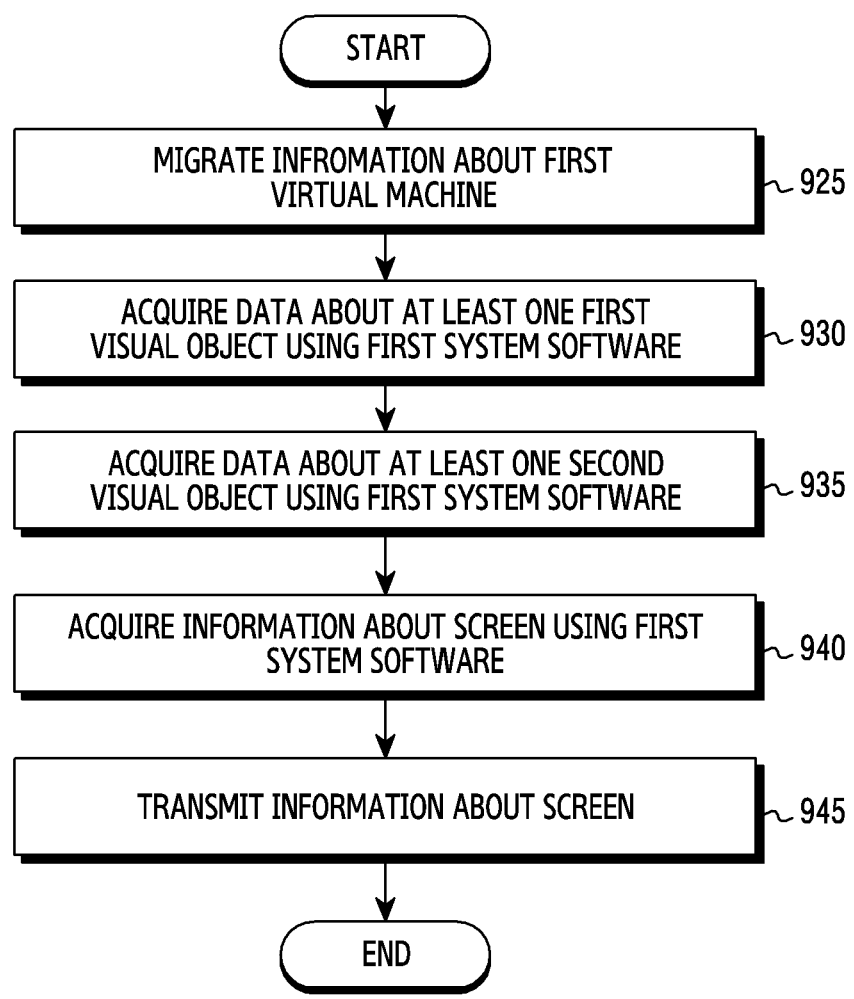
FIG. 9B is a flowchart illustrating another example operation of a first electronic device according to various embodiments.

FIG. 9B is a flowchart illustrating another example operation of a first electronic device according to various embodiments. This operation may be, for example, performed by the electronic device 101 shown in FIG. 1, the first electronic device 101 shown in FIG. 2, or the processor 120 included in the first electronic device 101.

Referring to FIG. 9B, in operation 925, the processor 120 may migrate information about the first virtual machine executed on the third system software installed in the second electronic device 102, from the second electronic device 102 to the first electronic device 101 through the communication circuitry 190, using the first system software. For example, the first system software may refer, for example, to system software installed in both the first electronic device 101 and the second electronic device 102. In various embodiments, unlike the second system software and the third system software, the first system software may refer, for example, to system software having an access authority for controlling at least one hardware in a vehicle embedding the second electronic device 102.

In operation 930, using the first system software, the processor 120 may acquire data about the at least one first visual object from the information about the first virtual machine. For example, the at least one first visual object may refer, for example, to a visual object acquirable through only the first virtual machine.

In operation 935, using the first system software, the processor 120 may acquire data about the at least one second visual object from the information about the second virtual machine executed on the second system software. For example, the second system software may refer, for example, to system software installed only in the first electronic device 101 among the first electronic device 101 and the second electronic device 102. In various embodiments, the at least one second visual object may refer, for example, to a visual object acquirable through only the second virtual machine.

FIG. 9B illustrates an example of performing operation 935 after performing operation 930, but this is for description convenience's sake, and an order of operations is not limited thereto. Operation 935 may be performed before performing operation 930 as well, and may be performed in parallel with operation 930 as well. For example, operation 935 may be performed independently from operation 930 as well.

In operation 940, the processor 120 may acquire, using the first system software, information about a screen including the at least one first visual object and the at least one second visual object. For example, by composing the at least one first visual object and the at least one second visual object, the processor 120 may acquire, using the first system software, the information about the screen which includes the at least one first visual object and the at least one second visual object.

In operation 945, to display the screen on a display (e.g., the first display 240, the second display 245, or a combination thereof) of the second electronic device 102, the processor 120 may transmit the information about the screen to the second electronic device 102 through the communication circuitry 190.

As described above, the first electronic device 101 of various embodiments may provide a user experience having continuity, by configuring a screen through the information acquired from the virtual machine executed on the second system software not installed in the second electronic device 102 and the information acquired from the virtual machine executed on the third system software migrated from the second electronic device 102. The first electronic device 101 of various embodiments may decrease a load of the second electronic device 102, by preventing the installing and executing of the second system software in the second electronic device 102 through operations illustrated in FIG. 9B.

Figure 10:
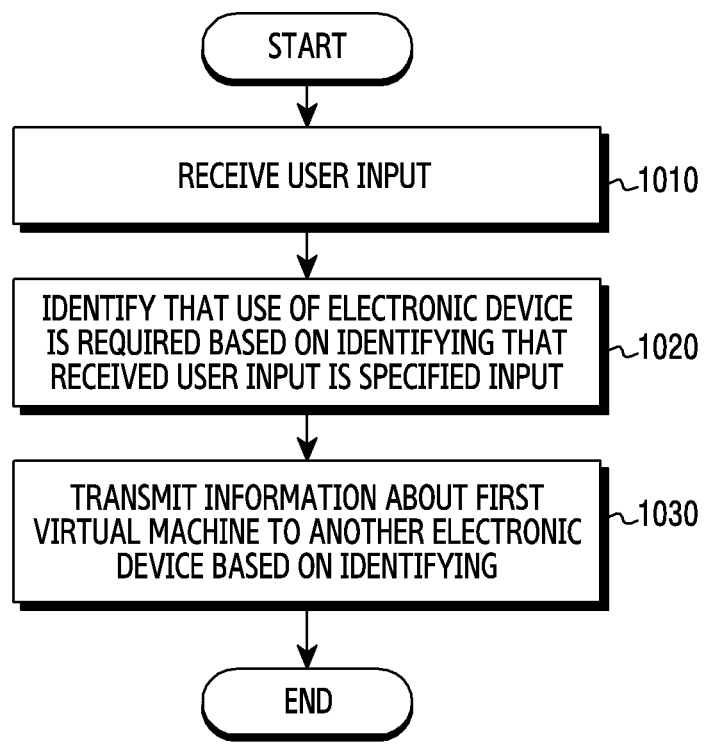
FIG. 10 is a flowchart illustrating an example operation of a second electronic device for migrating information about a first virtual machine according to various embodiments.

FIG. 10 is a flowchart illustrating an example operation of a second electronic device for migrating information about a first virtual machine according to various embodiments.

FIGS. 11A, 11B, 11C and FIG. 11D illustrate examples of user inputs for triggering the migrating of the information about the first virtual machine.

This operation may be performed by the electronic device 102 shown in FIG. 1, the electronic device 102 shown in FIG. 2, or the processor 210 included in the electronic device 102.

Referring to FIG. 10, in operation 1010, the processor 210 may receive an input, e.g., a user input. In various embodiments, the user input may refer, for example, to a specified input which is defined in the second electronic device 102 in order to trigger the migrating of the information about the first virtual machine. In various embodiments, the user input may be configured in various formats. For example, the user input may include, for example, and without limitation, a rotational input to a rotational structure included in the input device 230, a push input to a physical button included in the input device 230, a touch input to a touch sensor included in the input device 230, a voice command to a microphone included in the input device 230, or a combination thereof. In various embodiments, the user input may be defined in various schemes.

Figure 11A:
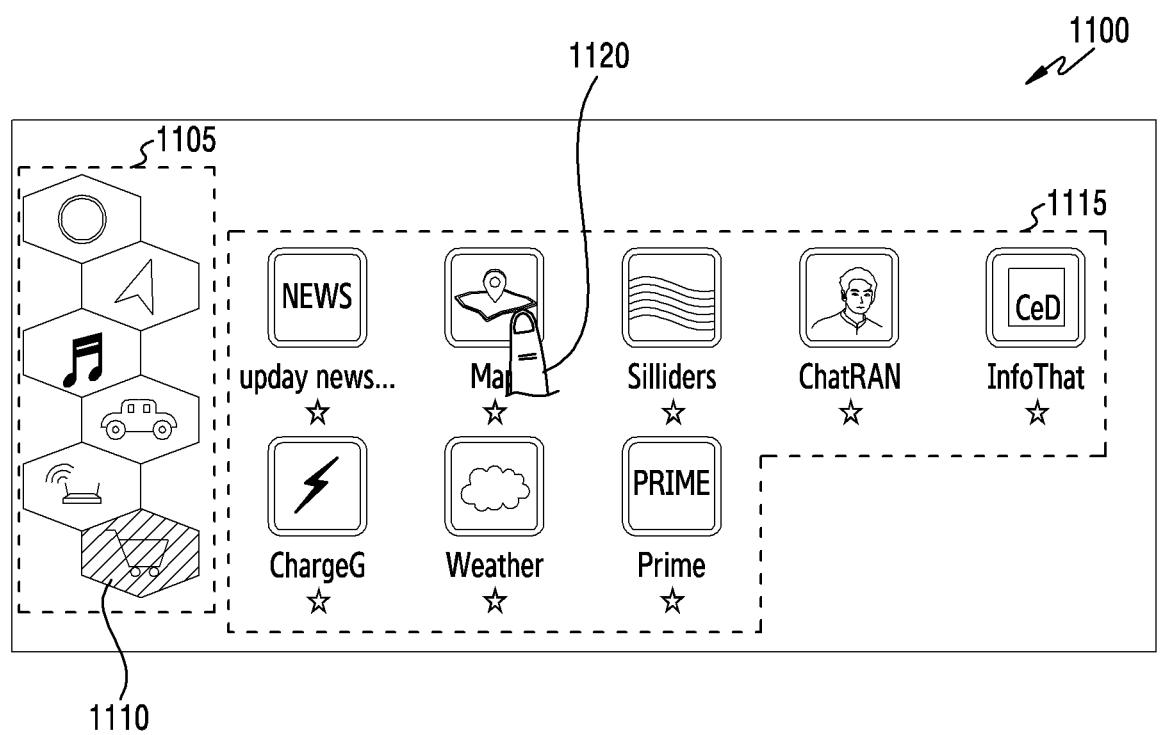
FIG. 11A, 11B, 11C and FIG. 11D are diagrams illustrating examples of user inputs for triggering the migrating of information about a first virtual machine.

For example, referring to FIG. 11A, the user input may be an input 1120 for selecting an application among applications 1115 in a specified category 1110 among a plurality of categories 1105 included in a screen 1100. In various embodiments, the applications 1115 in the specified category 1110 may be applications which are executable on the second system software installed only in the first electronic device 101. In various embodiments, the applications 1115 in the specified category 1110 may be applications which are installed in the first electronic device 101. However, an embodiment is not limited to this.

Figure 11B:
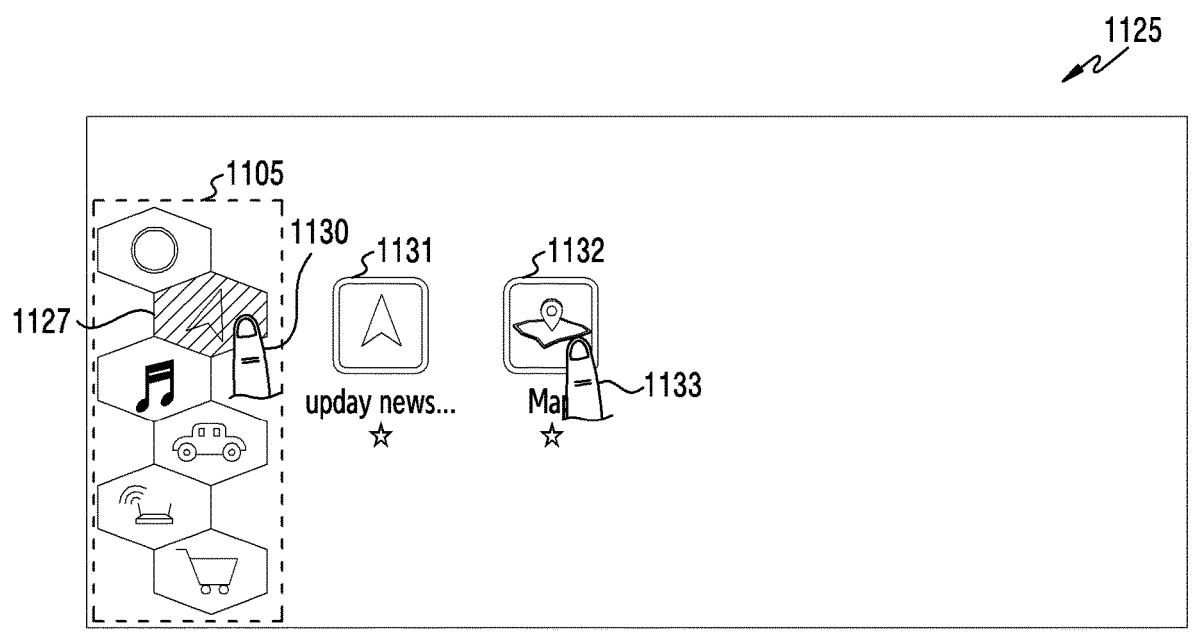

For another example, referring to FIG. 11B, the user input may be an input 1133 for selecting an object 1132 being a specified object among an object 1131 and the object 1132. The object 1131 and the object 1132 may be provided by an input 1130 for selecting one category 1127 among a plurality of categories 1105 as in a screen 1125. In various embodiments, an application indicated by the object 1132 may be an application which is executable on the second system software installed only in the first electronic device 101.

Figure 11C:
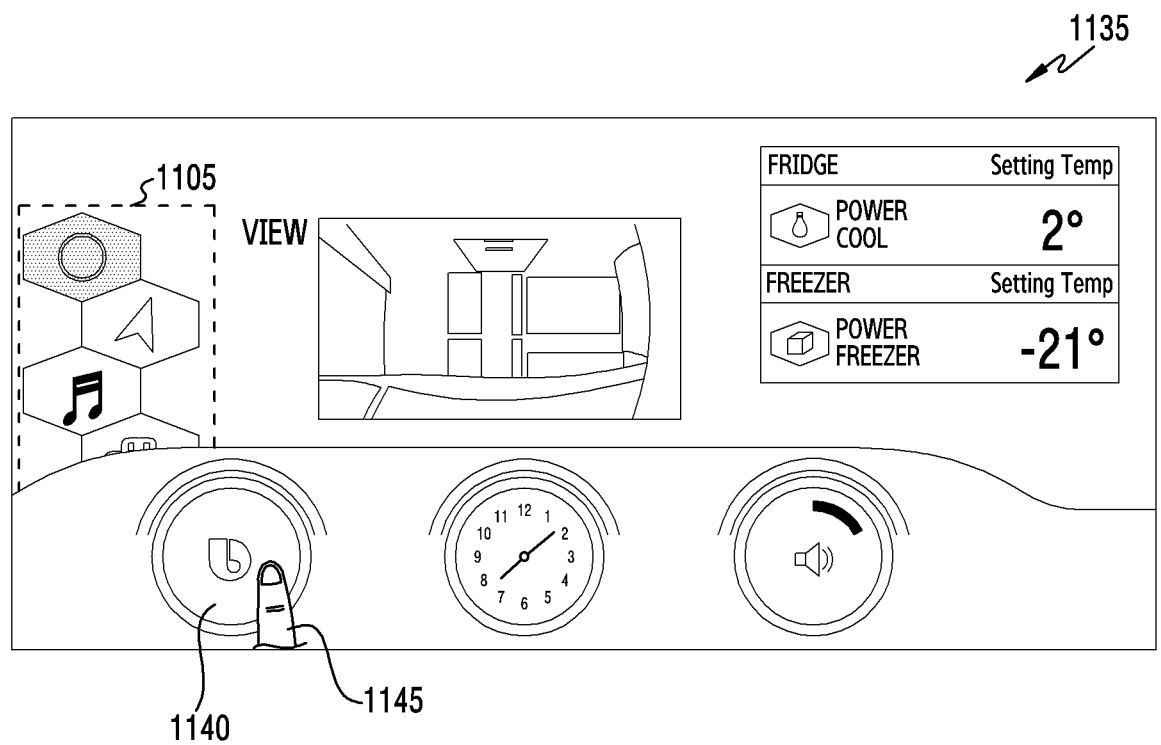

For further another example, referring to FIG. 11C, the user input may be an input 1145 for selecting a specified object 1140 in order to trigger interlocking with the first electronic device 101 as in a screen 1135 as well. In various embodiments, a function provided by the specified object 1140 may be a function requiring the execution of the second system software installed only in the first electronic device 101.

Figure 11D:
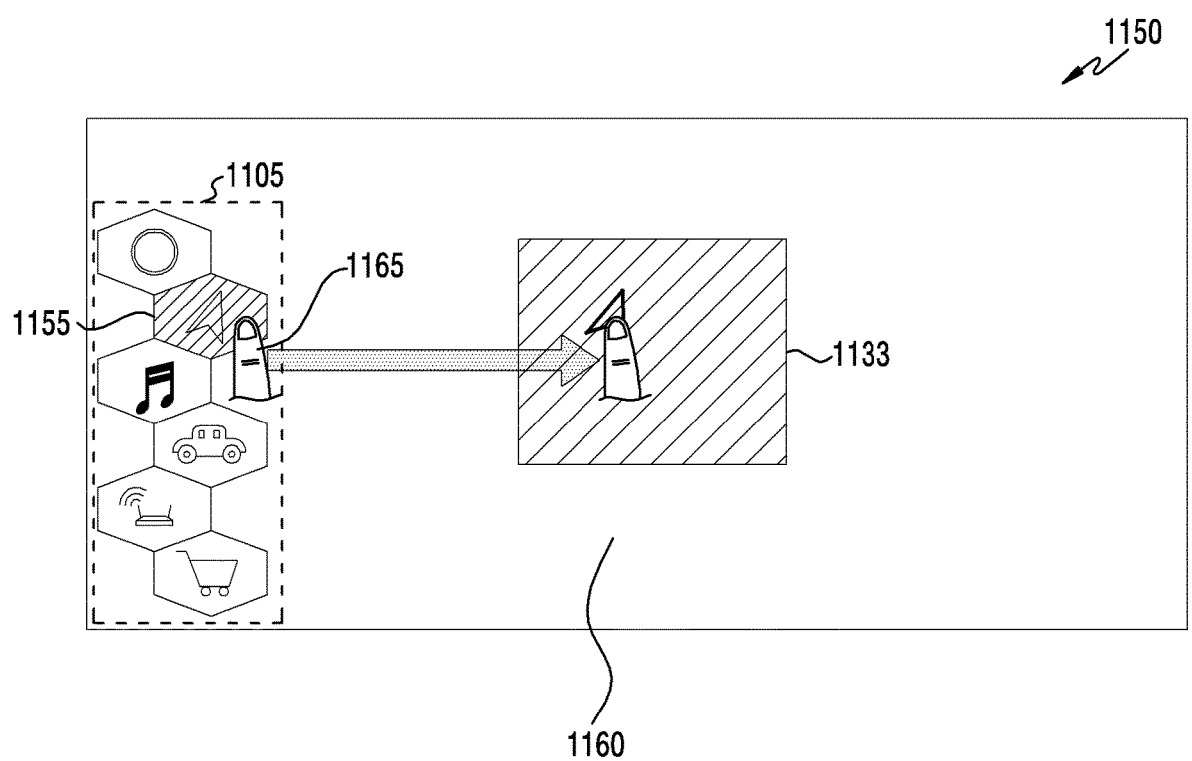

For yet another example, referring to FIG. 11D, the user input may be an input 1165 for moving one category 1155 among the plurality of categories 1105 to a specified area 1160 as in a screen 1150 as well. In various embodiments, a function provided by the movement to the specified area 1160 may be a function requiring the execution of the second system software installed only in the first electronic device 101. However, an embodiment is not limited to this.

In operation 1020, the processor 210 may identify that the use of the first electronic device 101 is required, based on identifying that the received user input is a specified input.

In operation 1030, the processor 210 may transmit the information about the first virtual machine to the first electronic device 101, in order to execute the first virtual machine in the first electronic device 101 based on the identifying.

As described above, the second electronic device 102 of various embodiments may initiate a procedure for migration between the first electronic device 101 and the second electronic device 102, using an input definable in various schemes. In other words, the electronic device 102 of various embodiments may perform interlocking with the first electronic device 101 through an intuitive input.

Figure 12:
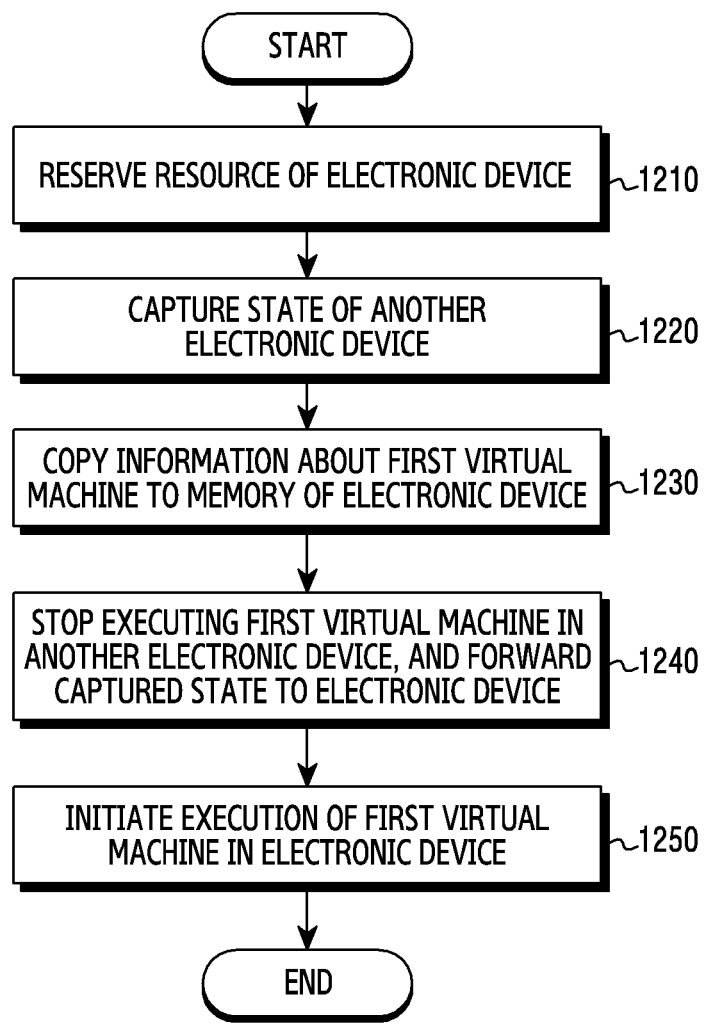
FIG. 12 is a flowchart illustrating an example operation of a second electronic device for performing a migration of a first virtual machine with an electronic device according to various embodiments.

FIG. 12 is a flowchart illustrating an example operation of a second electronic device for performing a migration of a first virtual machine with an electronic device according to various embodiments. This operation may be, for example, performed by the electronic device 102 shown in FIG. 1, the electronic device 102 shown in FIG. 2, or the processor 210 included in the electronic device 102.

According to various embodiments, operation 1210, 1220, 1230, 1240 and operation 1250 of FIG. 12 may be associated with operation 1030 of FIG. 10.

Referring to FIG. 12, in operation 1210, the processor 210 may reserve a resource of the first electronic device 101, based on identifying to migrate the information about the first virtual machine to the first electronic device 101. In various embodiments, the resource may include the memory 130 of the first electronic device 101, a register of the processor 120 of the first electronic device 101, or an input/output device of the first electronic device 101.

In operation 1220, for the migration, the processor 210 may capture a state of the second electronic device 102. For example, the capturing of the state of the second electronic device 102 may refer, for example, to acquiring information about a state of the memory 220 associated with the execution of the first virtual machine, a state of a register of the processor 210 associated with the execution of the first virtual machine, or a state of the input device 230, the first display 240, or the second display 245 associated with the execution of the first virtual machine.

In operation 1230, the processor 210 may copy the information about the first virtual machine to the memory 130 of the first electronic device 101. For example, the processor 210 may copy the information about the first virtual machine to a position of the memory 130 reserved in operation 1210, through the communication circuitry 250.

In operation 1240, the processor 210 may stop executing the first virtual machine in the second electronic device 102, and forward the captured state of the second electronic device 102 to the first electronic device 101. For example, to prevent and/or reduce a collision between information (e.g., the information about the screen) that will be received from the first electronic device 101 and information provided from the first virtual machine executed in the second electronic device 102, the processor 210 may stop executing the first virtual machine in the second electronic device 102. For example, to migrate a state of the first virtual machine to the first electronic device 101 as it is, the processor 210 may forward the captured state of the second electronic device 102 to the first electronic device 101.

In operation 1250, the processor 210 may initiate executing the migrated first virtual machine in the first electronic device 101. For example, by transmitting a control signal to the first electronic device 101, the processor 210 may initiate executing the migrated first virtual machine in the first electronic device 101.

As described above, to provide a user experience having continuity, the second electronic device 102 of various embodiments may migrate the information about the first virtual machine executed in the second electronic device 102, to the first electronic device 101.

Figure 13:
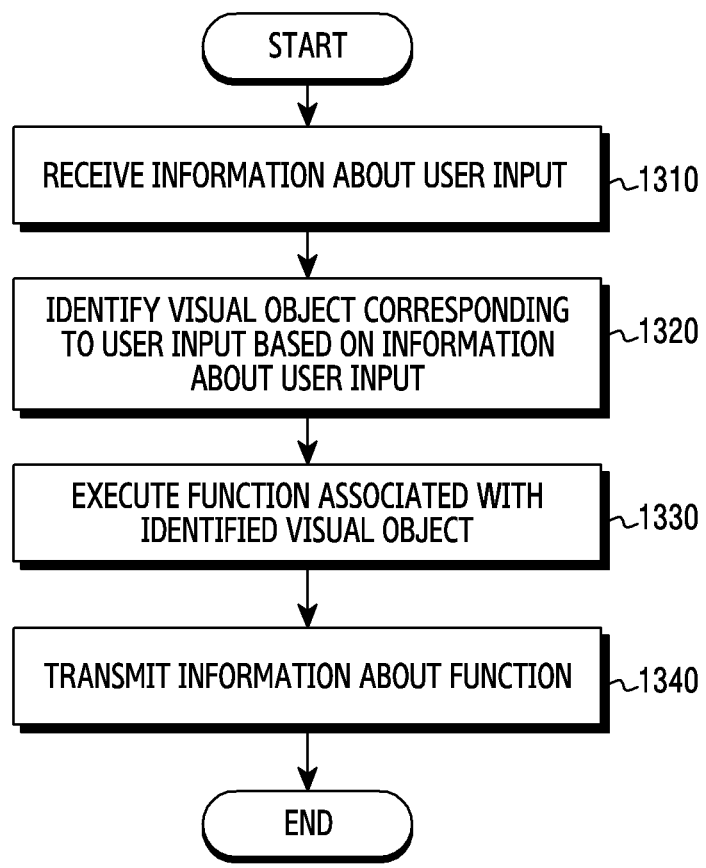
FIG. 13 is a flowchart illustrating an example operation of a first electronic device for processing a user input to a screen displayed in a second electronic device according to various embodiments.

FIG. 13 is a flowchart illustrating an example operation of a first electronic device for processing an input, e.g., a user input, to a screen displayed in a second electronic device according to various embodiments. This operation may be, for example, performed by the electronic device 101 shown in FIG. 1, the first electronic device 101 shown in FIG. 2, or the processor 120 included in the first electronic device 101.

Referring to FIG. 13, in operation 1310, the processor 120 may receive information about a user input received through a display of the second electronic device 102, from the second electronic device 102 displaying the screen including the at least one first visual object and the at least one second visual object, through the communication circuitry 190.

In operation 1320, the processor 120 may identify a visual object corresponding to the user input, based on the information about the user input. For example, using the first system software, the processor 120 may identify that the user input corresponds to the at least one first visual object among the at least one first visual object and the at least one second visual object. For another example, using the first system software, the processor 120 may identify that the user input corresponds to the at least one second visual object among the at least one first visual object and the at least one second visual object.

In operation 1330, based on the identifying, the processor 120 may execute a function associated with the identified visual object. For example, in response to the user input corresponding to the at least one first visual object, the processor 120 may execute a function associated with the at least one first visual object in the migrated first virtual machine. For another example, in response to the user input corresponding to the at least one second visual object, the processor 120 may execute a function associated with the at least one second visual object in the migrated second virtual machine.

In operation 1340, based on the execution, the processor 120 may transmit the information about the function to the second electronic device 102 through the communication circuitry 190. The transmitting may be performed using the first system software.

As described above, the first electronic device 101 of various embodiments may provide a feedback of an input, as an IVI service, through the second electronic device 102, by processing the input received while a screen is displayed through the display of the second electronic device 102 and transmitting a result of processing the input to the second electronic device 102.

Figure 14:
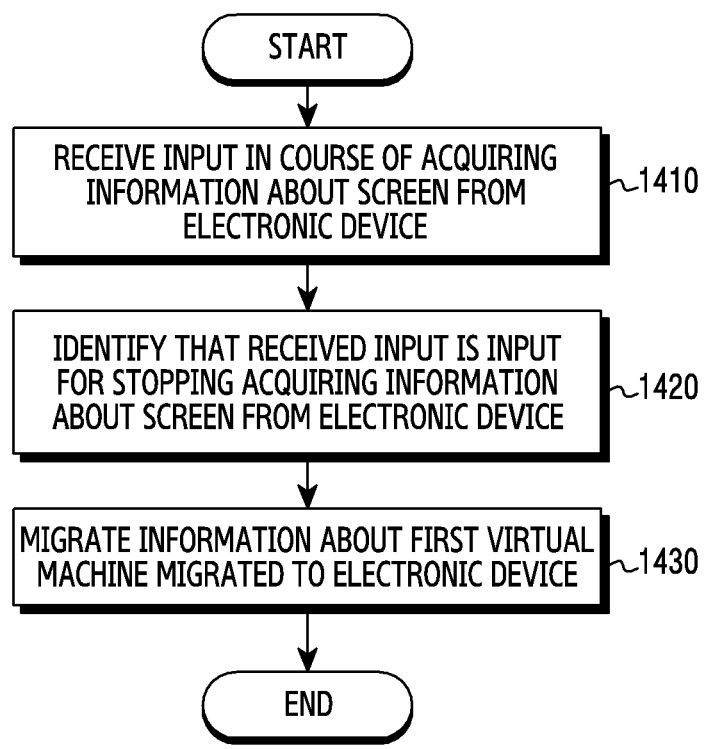
FIG. 14 is a flowchart illustrating an example operation of a second electronic device for migrating information about a first virtual machine executed in a first electronic device, based on an input received while a screen is displayed according to various embodiments.

FIG. 14 is a flowchart illustrating an example operation of a second electronic device for migrating information about a first virtual machine executed in a first electronic device, based on an input received while a screen is displayed according to various embodiments. This operation may be, for example, performed by the electronic device 102 shown in FIG. 1, the second electronic device 102 shown in FIG. 2, or the processor 210 included in the second electronic device 102.

Referring to FIG. 14, in operation 1410, the processor 210 may receive an input in the course of acquiring information about a screen from the first electronic device 101. For example, the processor 210 may receive the input in the course of acquiring, from the first electronic device 101, the information about the screen which includes the at least one first visual object and the at least one second visual object.

In operation 1420, the processor 210 may identify that the received input is an input for stopping acquiring the information about the screen from the first electronic device 101. For example, based on identifying that the received input is an input of indicating stopping executing an application installed in the first electronic device 101, the processor 210 may identify that the received input is the input for stopping acquiring the information about the screen.

In operation 1430, based on the identifying, the processor 210 may migrate information about the first virtual machine migrated to the first electronic device 101. For example, the processor 210 may identify to migrate the information about the first virtual machine executed in the first electronic device 101, again to the second electronic device 102 through the migration of operation 1030. Based on the identifying, the processor 210 may migrate the information about the first virtual machine from the first electronic device 101 to the second electronic device 102. The migration of operation 1430 may be performed similarly with operations exemplified through FIG. 12.

As described above, the second electronic device 102 of various embodiments may provide usability having continuity, by again migrating, from the first electronic device 101, the information about the first virtual machine executed on the third system software executed in the first electronic device 101, based on an input for stopping the use of the second system software executable in the first electronic device 101.

Figure 15:
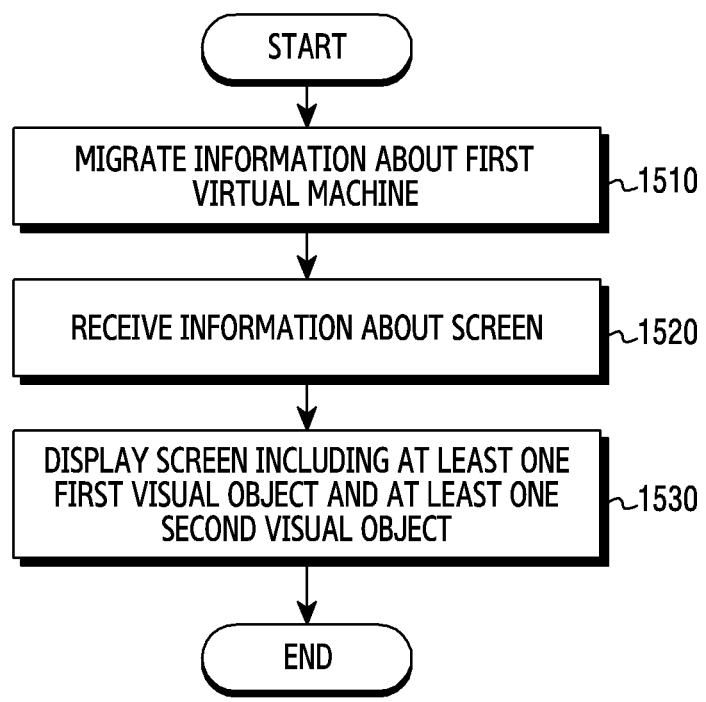
FIG. 15 is a flowchart illustrating an example operation of a second electronic device according to various embodiments.

FIG. 15 is a flowchart illustrating an example operation of a second electronic device according to various embodiments. This operation may be, for example, performed by the electronic device 102 shown in FIG. 1, the second electronic device 102 shown in FIG. 2, or the processor 210 included in the second electronic device 102.

Referring to FIG. 15, in operation 1510, using the first system software, the processor 210 may migrate information about the first virtual machine executed on the third system software, from the second electronic device 102 to the first electronic device 101 through the communication circuitry 250. In various embodiments, the first system software may be installed in both the first electronic device 101 and the second electronic device 102.

In operation 1520, using the first system software, the processor 210 may receive information about a screen that will be displayed through a display (e.g., the first display 240, the second display 245, or a combination thereof) of the second electronic device 102, from the first electronic device 101 through the communication circuitry 250.

In operation 1530, based on the receiving, the processor 210 may display, on the display of the second electronic device 102, a screen which includes the at least one first visual object acquired from the information about the first virtual machine, and the at least one second visual object acquired from the information about the second virtual machine executed on the second system software installed in the first electronic device 101.

As described above, in the course of using an application installed only in the first electronic device 101, the second electronic device 102 of various embodiments may provide usability having continuity, based on migration to the first electronic device 101 and screen composition in the first electronic device 101.

Methods according to various example embodiments of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described example embodiments of the present disclosure, a component included in the present disclosure is expressed in the singular or the plural according to a presented example embodiment. However, the singular form or plural form is selected for convenience of description suitable for the presented situation, and various example embodiments of the present disclosure are not limited to a single element or multiple elements thereof. Further, either multiple elements expressed in the description may be configured into a single element or a single element in the description may be configured into multiple elements.

While the present disclosure has been illustrated and described with reference to various example embodiments thereof, it will be understood by those skilled in the art that various changes in form and details may be made therein without departing from the true spirit and full scope of the present disclosure.

What is claimed is:

1. A portable electronic device connectable to an in-vehicle infotainment (IVI) electronic device embedded in a vehicle, the electronic device configured to provide IVI service through a display of the IVI electronic device embedded in the vehicle, the electronic device comprising:
   a memory configured to store a first system software and a second system software;
   communication circuitry; and
   at least one processor,
   wherein the at least one processor is configured to control the electronic device to:
   migrate information about a first virtual machine executed on a third system software installed in the IVI electronic device from the IVI electronic device to the electronic device through the communication circuitry using the first system software, the information about the first virtual machine comprising a state of a memory and/or a processor of the IVI electronic device;
   execute, using the first system software, the first virtual machine by resuming the first virtual machine having been executed in the IVI electronic device based on the migrated information about the first virtual machine;
   acquire data about at least one first visual object from the information about the first virtual machine using the first system software;
   acquire data about at least one second visual object from information about a second virtual machine executed on the second system software using the first system software;
   acquire information about a screen including the at least one first visual object and the at least one second visual object using the first system software; and
   control to transmit the acquired information about the screen to the IVI electronic device through the communication circuitry so that the screen is displayable on the display of the IVI electronic device.

2. The electronic device of claim 1, wherein the at least one processor is configured to control the electronic device to:
   acquire, using the first system software, the information about the screen which includes the at least one first visual object and the at least one second visual object by composing the at least one first visual object and the at least one second visual object.

3. The electronic device of claim 2, wherein the first system software installed in the IVI electronic device is further used to control at least one hardware in the vehicle.

4. The electronic device of claim 1, wherein the first system software is installed in both the electronic device and the IVI electronic device, and
   the second system software is installed only in the electronic device among the electronic device and the IVI electronic device.

5. The electronic device of claim 1, wherein the at least one processor is configured to control the electronic device to:
   receive, through the communication circuitry, information about an input received through the display of the IVI electronic device from the IVI electronic device displaying the screen on the display of the IVI electronic device;
   identify that the input corresponds to the at least one first visual object, using the first system software based on the information about the input;
   execute a function associated with the at least one first visual object in the migrated information about the first virtual machine based on the identifying; and
   control to transmit information about the function executed in the first virtual machine, to the IVI electronic device through the communication circuitry, using the first system software.

6. The electronic device of claim 1, wherein the at least one processor is configured to control the electronic device to:
receive, through the communication circuitry, information about an input received through the display of the IVI electronic device, from the IVI electronic device displaying the screen on the display of the IVI electronic device;
identify that the input corresponds to the at least one second visual object using the first system software based on the information about the input;
execute a function associated with the at least one second visual object in the second virtual machine based on the identifying; and
control to transmit information about the function executed in the second virtual machine to the IVI electronic device through the communication circuitry, using the first system software.

7. An in-vehicle infotainment (IVI) electronic device embedded in a vehicle and connectable with a portable electronic device configured to provide IVI service through the IVI electronic device, the electronic device comprising:
communication circuitry;
a display;
a memory configured to store a first system software and a third system software; and
at least one processor,
wherein the at least one processor is configured to control the IVI electronic device to:
migrate information about a first virtual machine executed on the third system software from the IVI electronic device to the portable electronic device through the communication circuitry using the first system software, the information about the first virtual machine comprising a state of the memory and/or the at least one processor of the portable electronic device to enable the portable electronic device to execute the first virtual machine by resuming the first virtual machine having been executed in the IVI electronic device;
receive information about a screen to be displayed on the display from the portable electronic device through the communication circuitry using the first system software; and
control to display, on the display, the screen including at least one first visual object acquired from the information about the first virtual machine and at least one second visual object acquired from information about a second virtual machine executed on a second system software installed in the portable electronic device based on the receiving.

8. The electronic device of claim 7, wherein the first system software is installed in both the electronic device and the portable electronic device, and
the third system software is installed only in the electronic device.

9. The electronic device of claim 8, wherein the first system software installed in the electronic device is further used to control at least one hardware comprising the display in the vehicle.

10. The electronic device of claim 7, wherein the at least one processor is further configured to control the electronic device to:
receive an input to the screen displayed on the display;
control to transmit information about a position of receiving the input to the portable electronic device through the communication circuitry using the first system software;
receive information about a function corresponding to the position of receiving the input from the portable electronic device through the communication circuitry; and
control to display another screen associated with the function on the display based on the information about the function.

11. The electronic device of claim 10, wherein the another screen is displayed together with the screen.

12. The electronic device of claim 10, wherein the another screen is converted from the screen.

13. The electronic device of claim 7, wherein the at least one processor is configured to control the electronic device to: migrate the information about the first virtual machine executed on the third system software from the electronic device to the portable electronic device through the communication circuitry, using the first system software in response to receiving a first specified input.

14. An in-vehicle infotainment (IVI) electronic device embedded in a vehicle and connectable to a portable electronic device and configured to provide IVI service through the IVI electronic device, the electronic device comprising:
a display;
a memory configured to store a first system software and a third system software;
communication circuitry; and
at least one processor,
wherein the at least one processor is configured to control the electronic device to:
migrate information about a first virtual machine executed on the third system software from the IVI electronic device to the portable electronic device through the communication circuitry using the first system software, using the first system software in response to receiving a first specified input;
receive information about a screen to be displayed on the display from the portable electronic device through the communication circuitry using the first system software;
control to display, on the display, the screen including at least one first visual object acquired from the information about the first virtual machine and at least one second visual object acquired from information about a second virtual machine executed on a second system software installed in the portable electronic device based on the receiving;
receive a second specified input distinct from the first specified input before migrating the information about the first virtual machine to the portable electronic device;
acquire data about the at least one first visual object from the information about the first virtual machine executed on the third system software in response to receiving the second specified input; and
control to display another screen including only the at least one first visual object among the at least one first visual object and the at least one second visual object based on the acquiring.

* * * * *